(12) United States Patent
Zhang et al.

(10) Patent No.: US 12,112,405 B2
(45) Date of Patent: Oct. 8, 2024

(54) THEME ICON GENERATION METHOD AND APPARATUS, AND COMPUTER DEVICE

(71) Applicant: Petal Cloud Technology Co., Ltd., Guangdong Province (CN)

(72) Inventors: Wenjie Zhang, Nanjing (CN); Weicai Zhong, Xi'an (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 141 days.

(21) Appl. No.: 17/788,463

(22) PCT Filed: Nov. 12, 2020

(86) PCT No.: PCT/CN2020/128272
§ 371 (c)(1),
(2) Date: Jun. 23, 2022

(87) PCT Pub. No.: WO2021/129213
PCT Pub. Date: Jul. 1, 2021

(65) Prior Publication Data
US 2023/0045077 A1    Feb. 9, 2023

(30) Foreign Application Priority Data

Dec. 24, 2019  (CN) .......................... 201911348172.7

(51) Int. Cl.
*G09G 5/02* (2006.01)
*G06T 7/194* (2017.01)
(Continued)

(52) U.S. Cl.
CPC ............ *G06T 11/001* (2013.01); *G06T 7/194* (2017.01); *G06T 7/90* (2017.01); *G06T 11/40* (2013.01); *G06T 2210/62* (2013.01)

(58) Field of Classification Search
CPC ......... G06T 11/001; G06T 7/194; G06T 7/90; G06T 11/40; G06T 2210/62
(Continued)

(56) References Cited

U.S. PATENT DOCUMENTS

| 2002/0065605 A1 | 5/2002 | Yokota | |
| 2007/0124700 A1* | 5/2007 | Koivisto | G06F 9/451 715/837 |
| 2007/0180406 A1* | 8/2007 | Hanechak | G06F 3/0481 715/837 |

(Continued)

FOREIGN PATENT DOCUMENTS

| CN | 104035665 A | 9/2014 |
| CN | 105653128 A | 6/2016 |

(Continued)

OTHER PUBLICATIONS

"Non-Official translation: How to Extract Icons," Apr. 27, 2013, with partial translation, 7 pages.

*Primary Examiner* — Gordon G Liu
(74) *Attorney, Agent, or Firm* — Conley Rose, P.C.

(57) ABSTRACT

A theme icon generation method includes obtaining an application icon, where the application icon includes a transparent region and an opaque region, and the opaque region includes an icon background and a first logo graphic; segmenting a first logo graphic from the opaque region; adjusting a size of the first logo graphic to generate a second logo graphic; and fusing the second logo graphic with a theme template to generate a theme icon.

18 Claims, 18 Drawing Sheets

(51) Int. Cl.
    *G06T 7/90*     (2017.01)
    *G06T 11/00*     (2006.01)
    *G06T 11/40*     (2006.01)

(58) Field of Classification Search
    USPC .......................................................... 345/589
    See application file for complete search history.

(56) References Cited

U.S. PATENT DOCUMENTS

| | | | |
|---|---|---|---|
| 2010/0092107 A1* | 4/2010 | Mochizuki | G03B 31/06 |
| | | | 715/730 |
| 2014/0002506 A1 | 1/2014 | Li et al. | |
| 2014/0101614 A1 | 4/2014 | Huang | |
| 2019/0325626 A1* | 10/2019 | Tao | G06T 11/60 |

FOREIGN PATENT DOCUMENTS

| | | |
|---|---|---|
| CN | 105867901 A | 8/2016 |
| CN | 106201212 A | 12/2016 |
| CN | 106445276 A | 2/2017 |
| CN | 106775688 A | 5/2017 |
| CN | 108037878 A | 5/2018 |
| CN | 102622163 B | 6/2018 |
| CN | 108664298 A | 10/2018 |
| CN | 109831584 A | 5/2019 |
| CN | 109886890 A | 6/2019 |
| CN | 109901759 A | 6/2019 |
| CN | 106296775 B | 6/2020 |
| WO | 2011150870 A2 | 12/2011 |
| WO | 2018103418 A1 | 6/2018 |
| WO | 2018120011 A1 | 7/2018 |

* cited by examiner

THEME ICON GENERATION METHOD AND APPARATUS, AND COMPUTER DEVICE

CROSS-REFERENCE TO RELATED APPLICATIONS

This is a U.S. National Stage of International Patent Application No. PCT/CN2020/128272 filed on Nov. 12, 2020, which claims priority to Chinese Patent Application No. 201911348172.7 filed on Dec. 24, 2019. Both of the aforementioned applications are hereby incorporated by reference in their entireties.

TECHNOLOGY

This application relates to a theme icon generation method and apparatus, and a computer device.

BACKGROUND

A system theme is an interface style of a system, including a window color, a control layout, and an icon style. By selecting a system theme, a user can change the interface style of the system to suit user's aesthetics.

During a system theme design process, a designer will design a corresponding theme icon for a system application. After the user change the system theme, the theme icon replaces an original application icon to ensure that a display style of an entire page is the same. Some third-party apps installed by users, such as HUAWEI LEARNING and VMALL, do not have corresponding theme icons, Therefore, original app icons are still used. This is different from a theme style.

FIG. 1 is a schematic diagram of an interface of an existing terminal. As shown in FIG. 1, theme icons in the interface are circular icons in style and have a same size. However, for third-party applications "HU/MEI LEARNING" and "VMALL" installed by a user, original app icons are still used because designers do not design corresponding theme icons. Different from a theme style, a display style of an entire interface cannot be consistent.

In a related technology, the original application icon is directly superimposed on a background layer to generate the theme icon. The theme icon has an obvious overlap trace, and different theme icons have different styles.

SUMMARY

This application provides a theme icon generation method and apparatus, and a computer device, so that an application icon can be automatically converted into a theme icon, and the generated theme icon has no overlap trace.

According to a first aspect, this application provides a theme icon veneration method, including: obtaining an application icon, inhere the application icon includes a transparent region and an opaque region, and the opaque region includes an icon background and a first logo graphic; segmenting the first logo graphic from the opaque area of the application icon; adjusting a size of the first logo graphic to generate a second logo graphic; and fusing the second logo graphic with a theme template to generate a theme icon.

Optionally, the segmenting the first logo graphic from the opaque area of the application icon includes: performing binarization processing on the application icon, to determine the opaque region; and performing image segmentation processing on the opaque region to generate the first logo graphic.

Optionally, the adjusting a size of the first logo graphic to generate a second logo graphic includes: obtaining a theme reference icon; segmenting a reference logo graphic from the theme reference icon; and adjusting the size of the first logo graphic based on a size of the reference logo graphic.

Optionally, the adjusting the size of the first logo graphic based on a size of the reference logo graphic includes: comparing the size of the first logo graphic with the size of the reference logo graphic; and scaling, based on a comparison result, the first logo graphic by using an interpolation algorithm, so that the size of the second logo graphic is the same as the size of the reference logo graphic.

Optionally, after the scaling, based on a comparison result, the first logo graphic by using an interpolation algorithm, so that the size of the second logo graphic is the same as the size of the reference logo graphic, the method further includes: generating a color histogram corresponding to the reference logo graphic; and determining a color gradation status of the reference logo graphic based on a color quantity and a hue distribution in the color histogram.

Optionally, the determining a color gradient status of the reference logo graphic based on a color quantity and a hue distribution in the color histogram includes: when the color quantity is less than or equal to a first preset threshold, determining that the reference logo graphic is monochrome, and that no color gradient exists; or when the color quantity is greater than the first preset threshold, and a color difference between two colors is less than a second preset threshold, determining that color gradient exists in the reference logo graphic; or when the color quantity is greater than the first preset threshold, and a color difference between any two colors is greater than or equal to the second preset threshold; determining that the reference logo graphic includes a plurality of colors, and that no color gradient exists.

Optionally, after the scaling, based on a comparison result, the first logo graphic by using an interpolation algorithm, so that the size of the second logo graphic is the same as the size of the reference logo graphic, the method further includes: performing edge detection on the reference logo graphic to determine an edge of the reference logo graphic; performing straight line detection on the theme reference icon, to obtain a straight line in the theme reference icon; comparing the edge with the straight line; and determining a projection status of the reference logo graphic based on a comparison result.

Optionally, the determining a projection status of the reference logo graphic based on a comparison result includes: when all the straight lines are part of the edge, determining that the reference logo graphic has no projection; or when the straight line is not part of the edge, determining that the reference logo graphic has a projection.

Optionally, after the determining that the reference logo graphic has a projection, the method further includes: calculating a scale and direction of the projection based on the straight line that is not part of the edge.

Optionally, before the fusing the second logo graphic with a theme template to generate a theme icon, the method further includes: performing color gradient processing and projection processing on the second logo graphic based on the color gradient status of the reference logo graphic and the projection status of the reference logo graphic.

Optionally, the fusing the second logo graphic with a theme template to generate a theme icon includes: obtaining application information corresponding to the application icon, where the application information includes at least one of an application category, an icon background color, and a company to which an application belongs; matching the corresponding theme template from a theme template library based on the application information; and fusing the second logo graphic with the theme template to generate the theme icon.

Optionally, the fusing the second logo graphic with a theme template to generate a theme icon further includes: detecting a graphic complexity of the second logo graphic; and when the graphic complexity is less than a third preset threshold, superimposing the second logo graphic on the theme template, to generate the theme icon; or when the graphic complexity is greater than or equal to the third preset threshold, performing poisson blending on the second logo graphic and the theme template, to generate the theme icon.

According to a second aspect, this application provides a theme icon generation apparatus, including: an obtaining module, configured to obtain an application icon, where the application icon includes a transparent region and an opaque region, and the opaque region includes an icon background and a first logo graphic; a segmentation module, configured to segment the first logo graphic from the opaque area of the application icon; an adjustment module, configured to adjust a size of the first logo graphic to generate a second logo graphic; and a fusion module, configured to fuse the second logo graphic with a theme template to generate a theme icon.

Optionally, the segmentation module includes: a first processing submodule, configured to perform binarization processing on the application icon to determine the opaque region; and a second processing submodule, configured to perform image segmentation processing on the opaque region to generate the first logo graphic.

Optionally, the adjustment module includes: a first obtaining submodule, configured to obtain a theme reference icon; a segmentation submodule, configured to segment a reference logo graphic from the theme reference icon; and an adjustment submodule, configured to adjust the size of the first logo graphic based on a size of the reference logo graphic.

Optionally, the adjustment submodule includes: a comparison unit, configured to compare the size of the first logo graphic with the size of the reference logo graphic; and a scaling unit, configured to scale, based on a comparison result, the first logo graphic by using an interpolation algorithm, so that a size of the second logo graphic is the same as the size of the reference logo graphic.

Optionally, the adjustment submodule further includes: a generation unit, configured to generate a color histogram corresponding to the reference logo graphic; and a first determining unit, configured to determine a color gradient status of the reference logo graphic based on a color quantity and a hue distribution in the color histogram.

Optionally, the first determining unit includes: a first determining subunit, configured to: when the color quantity is less than or equal to a first preset threshold, determine that the reference logo graphic is monochrome, and that no color gradient exists; a second determining subunit, configured to: when the color quantity is greater than the first preset threshold, and a color difference between two colors is less than a second preset threshold, determine that the color gradient exists in the reference logo graphic; and a third determining subunit, configured to: when the color quantity is greater than the first preset threshold, and a color difference between any two colors is greater than or equal to the second preset threshold, determine that the reference logo graphic includes a plurality of colors, and that no color gradient exists.

Optionally, the adjustment submodule further includes: a first detection unit, configured to perform edge detection on the reference logo graphic to determine an edge of the reference logo graphic; a second detection unit, configured to perform straight line detection on the theme reference icon, to obtain a straight line in the theme reference icon; a comparison unit, configured to compare the edge with the straight line; and a second determining unit, configured to determine a projection status of the reference logo graphic based on a comparison result.

Optionally, the second determining unit includes: a fourth determining subunit, configured to: when all the straight lines are part of the edge, determine that the reference logo graphic has no projection; and a fifth determining subunit, configured to: when the straight line is not part of the edge, determine that the reference logo graphic has a projection.

Optionally, the second determining unit further includes: a calculation subunit; configured to calculate a scale and direction of the projection based on the straight line that is not part of the edge.

Optionally, the apparatus further includes: a processing module, configured to perform color gradient processing and projection processing on the second logo graphic based on the color gradient status of the reference logo graphic and the projection status of the reference logo graphic.

Optionally, the fusion module includes: a second obtaining submodule, configured to obtain application information corresponding to the application icon, where the application information includes at least one of an application category, an icon background color, and a company to which an application belongs; a matching submodule, configured to match the corresponding theme template from a theme template library based on the application information; and a fusion submodule, configured to fuse the second logo graphic with the theme template to generate the theme icon.

Optionally, the fusion submodule includes: a third detection unit, configured to detect a graphic complexity of the second logo graphic; a superimposing unit, configured to superimpose the second logo graphic on the theme template when the graphic complexity is less than a third preset threshold, to generate the theme icon; and a fusion unit, configured to perform poisson blending on the second logo graphic and the theme template when the graphic complexity is greater than or equal to the third preset threshold, to generate the theme icon.

According to a third aspect, this application provides a computer device, including a memory and a processor. When instructions in the memory are executed by the processor, the computer device is enabled to implement the foregoing theme icon generation method.

According to a fourth aspect, this application provides a non-transitory computer-readable storage medium, where the non-transitory computer-readable storage medium stores a computer program, and when the computer program is executed by a processor, the foregoing theme icon veneration method is implemented.

DESCRIPTION OF EMBODIMENTS

The following describes embodiments of this invention in detail. Examples of the embodiments are shown in the accompanying drawings. Same or similar reference signs are always used to represent same or similar elements or elements having same or similar functions. The embodiments described below with reference to the accompanying drawings are examples, and are intended to explain the present invention, but cannot be understood as a limitation on the present invention.

To describe the theme icon generation method provided in the embodiments of this application more clearly, an existing theme icon generation method is first described.

Figure 1:
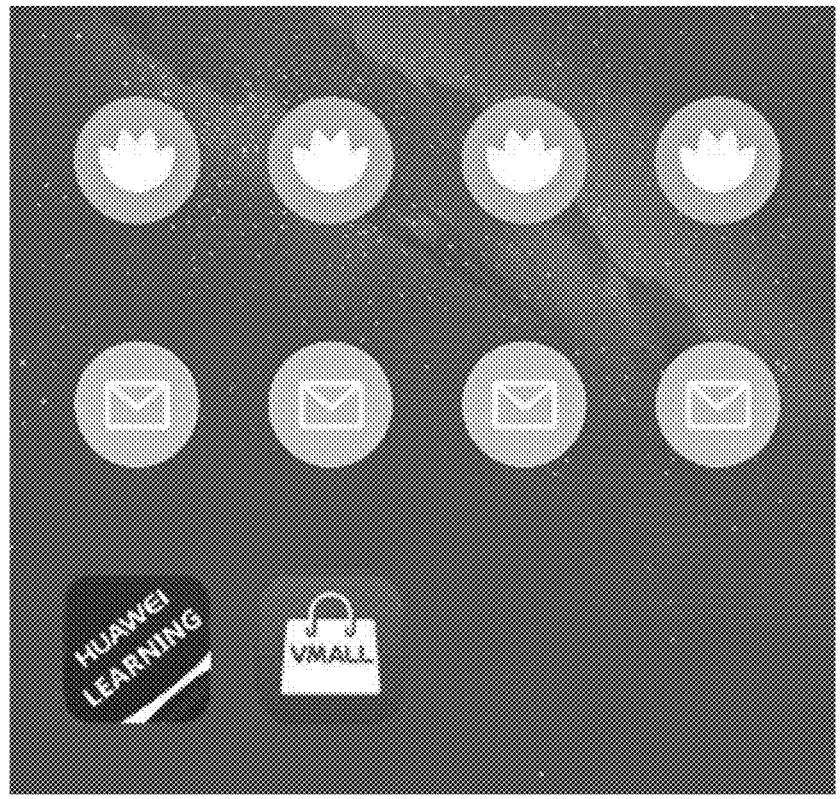
FIG. 1 is a schematic diagram of an interface of an existing terminal.
Figure 2A:
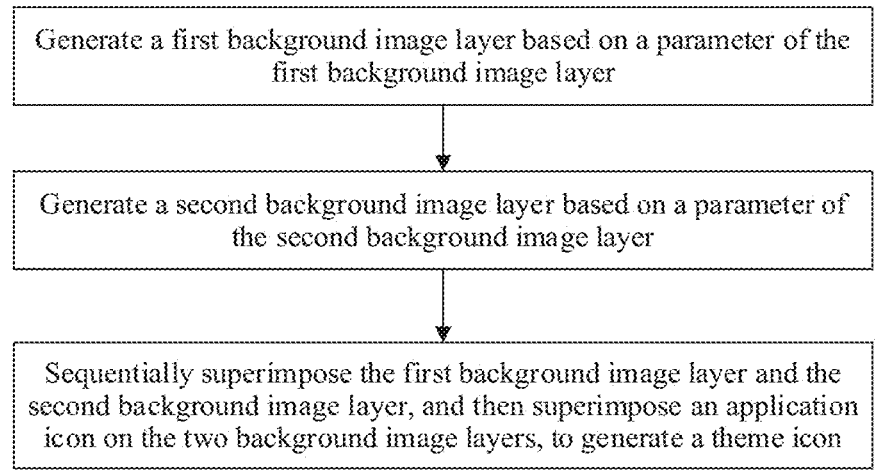
FIG. 2a is a schematic flowchart of a theme icon generation method in the conventional technology.
Figure 2B:
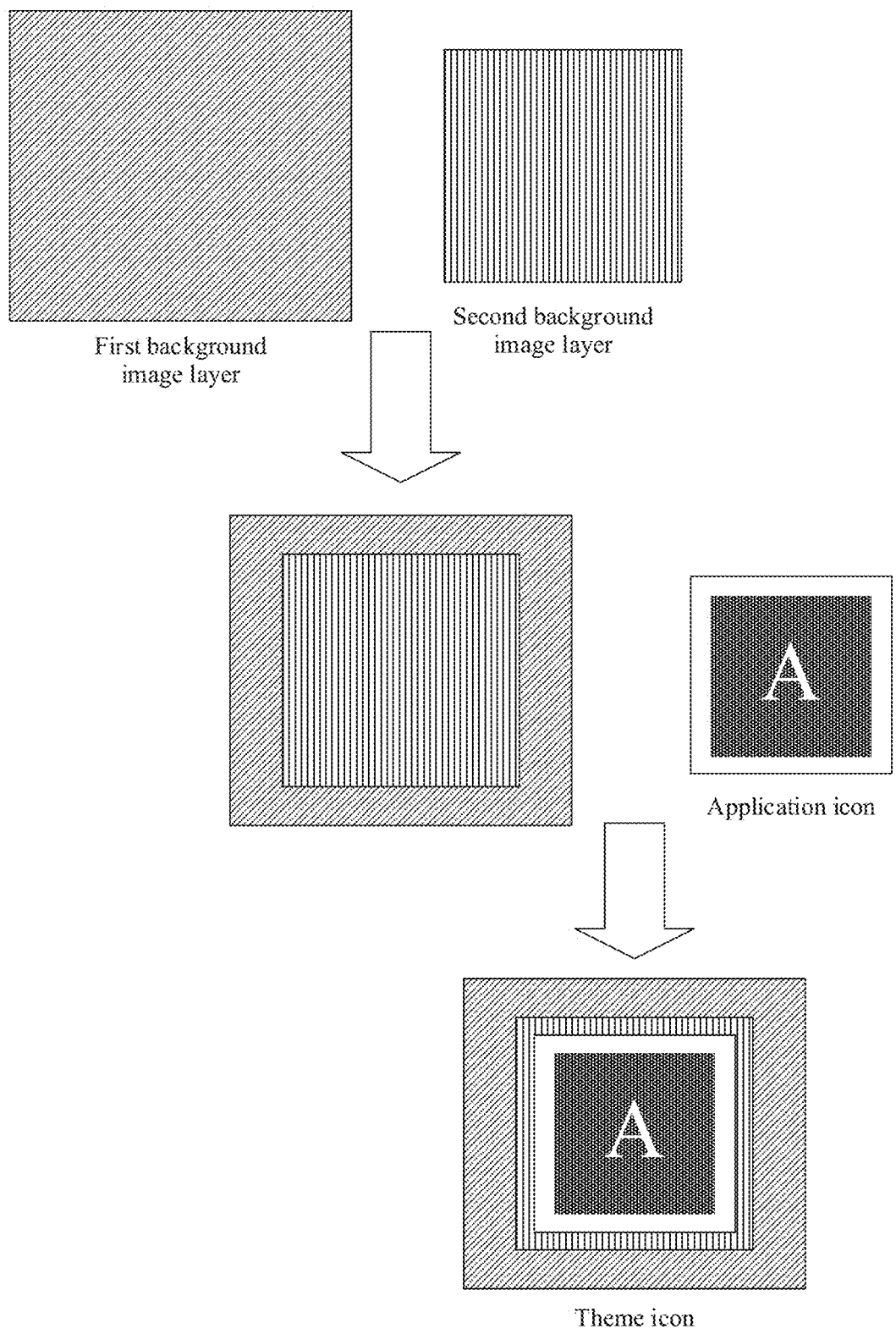
FIG. 2b is a schematic diagram of an effect of a theme icon generation method in the conventional technology.

FIG. 2a is a schematic flowchart of a theme icon generation method in the conventional technology. FIG. 2b is a schematic diagram of an effect of a theme icon generation method in the conventional technology.

As shown in FIG. 2a and FIG. 2b, in the conventional technology, a designer determines a related parameter of a first background layer, which specifically includes parameters such as a color, a shape, a size, and transparency of the first background layer, to generate the first background layer based on the parameter of the first background layer. Similarly, a designer determines a related parameter of a second background layer, to generate the second background layer based on the parameter of the second background layer. The second background layer is first superimposed on the first background layer, and then an application icon is superimposed on the two background layers, to generate a theme icon.

As shown in FIG. 2b, in the conventional technology, the application icon is directly superimposed on the two background layers, and the generated theme icon has an obvious overlap trace, and although different theme icons all use the same two background layers, application icons superimposed on the two background layers are different. Styles of the generated theme icons are different.

After carefully studying the conventional technology, an applicant finds that the theme icon generated in the conventional technology has an obvious overlap trace because an opaque area in the application icon differs greatly from a background layer, so that the application icon is directly superimposed on the background layer. There is an obvious overlap trace at a junction between the opaque area and the background layer.

The applicant considers that the opaque area in the application icon may be further segmented into an icon background and a first logo graphic. Specifically, the first logo graphic is an identifier part that is in an application icon and that is used to distinguish different applications, and the icon background is a background part that is used to foil and beautify the first logo graphic. Therefore, the finally generated theme icon needs to be retained only after the first logo graphic is processed, so as to distinguish different applications.

Figure 3:
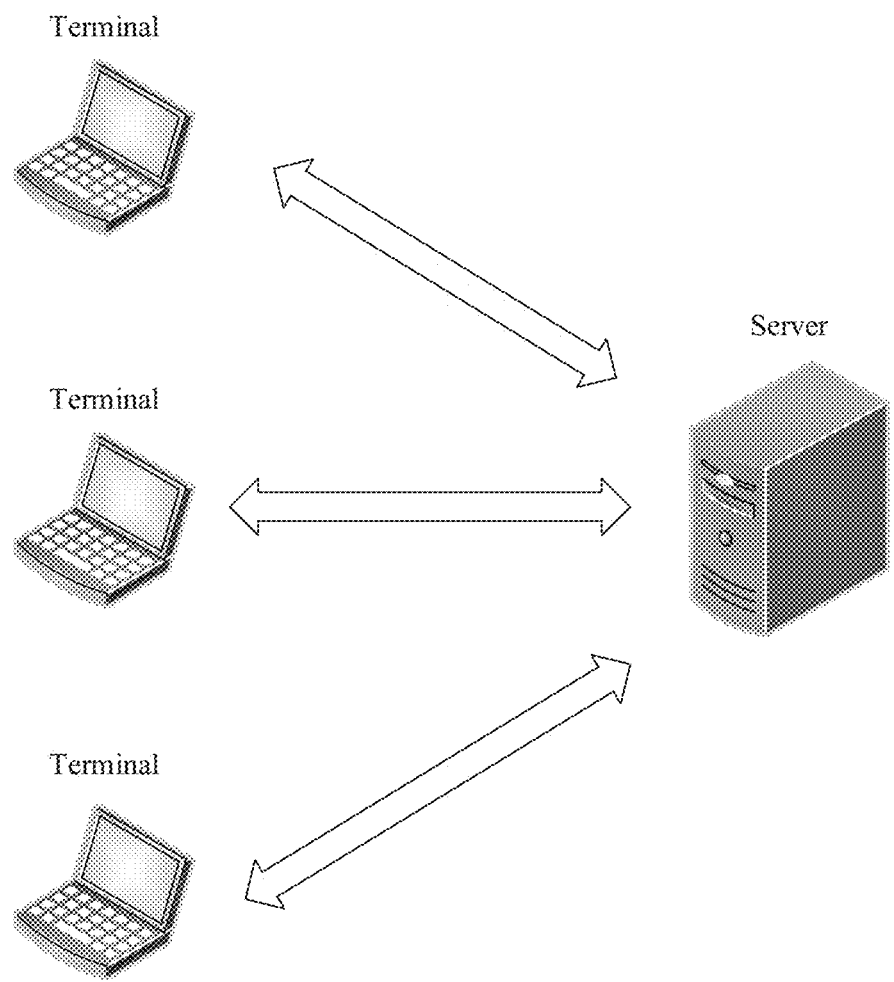
FIG. 3 is a schematic diagram of a structure of a theme icon generation system according to an embodiment of this application.

To resolve a technical problem in the conventional technology that, in a technical solution of a theme icon generated according to an application icon, an existing theme icon has an obvious overlap trace, and a style difference exists between different theme icons, an embodiment of this application provides a theme icon generation method. FIG. 3 is a schematic diagram of a structure of a theme icon generation system according to an embodiment of this application.

Figure 4:
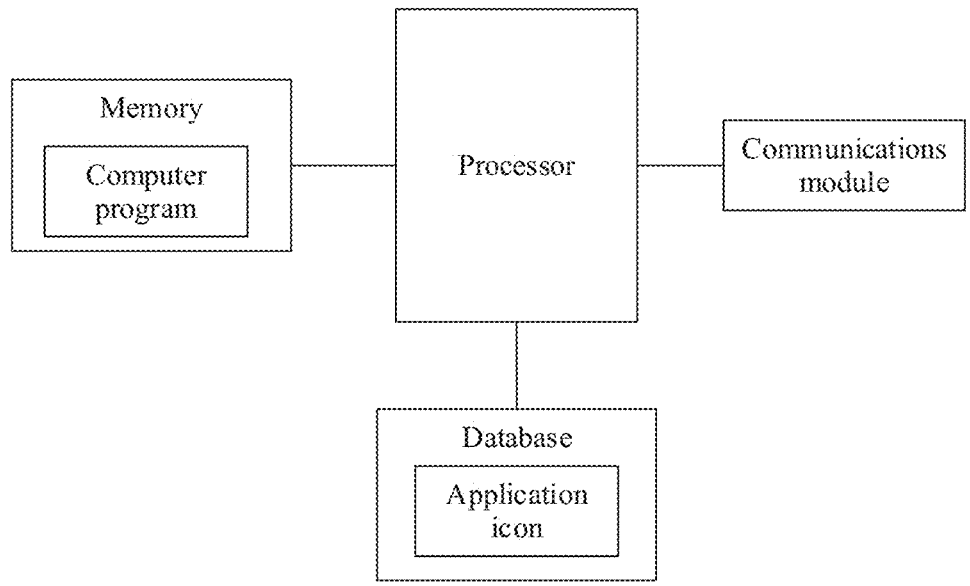
FIG. 4 is a schematic diagram of a structure of a server in FIG. 3.

As shown in FIG. 3, the theme icon generation system in this embodiment of this application includes at least one server and at least one terminal. One server may be connected to a plurality of terminals, a client may be installed on each terminal, and a network adapter may be installed. The terminal may send a data transmission request to the server by using the network adapter. The data transmission request may be a request for uploading a theme reference icon, or may be a request for receiving a theme icon. After allowing the terminal to perform data transmission, the server performs data transmission with the terminal, and generates a theme icon based on the theme reference icon. The client may be clients of different institutions, or may be clients of a same institution. When using the system, a designer only needs to design a corresponding theme icon for a system application, use the theme icon corresponding to the system application as the theme reference icon, and send the theme reference icon to the server by using the terminal. The server processes, based on the theme reference icon, a third-party application icon stored on the server, to generate a corresponding theme icon, and returns the corresponding theme icon to the terminal, so that the application icon is automatically converted into the theme icon, FIG. 4 is a schematic diagram of a structure of a server in FIG. 3. As shown in FIG. 4, a server, also referred to as a server, is a device that provides a data processing service. The server needs to respond to a service request and process the service request. Therefore, usually, the server needs to have capabilities of bearing a service and securing the service. The server includes a processor, a memory, a communications module, and the like. An architecture of the server is similar to a general computer architecture. However, because the server needs to provide highly reliable services, the server has high requirements on a processing capability, stability, reliability, security, scalability, manageability, and the like. A memory of a server in a theme icon generation system stores a computer program, and the computer program can be executed by the processor to implement the method provided in the following method embodiments. In addition, the server further includes a database. The database stores a third-party application icon. When the computer program stored in the memory is executed, the third-party application icon stored in the database can be converted into a corresponding theme icon. The communications module of the server is configured to perform data transmission with the terminal, receive a theme reference icon from the terminal, and return the generated theme icon to the terminal.

Figure 5:
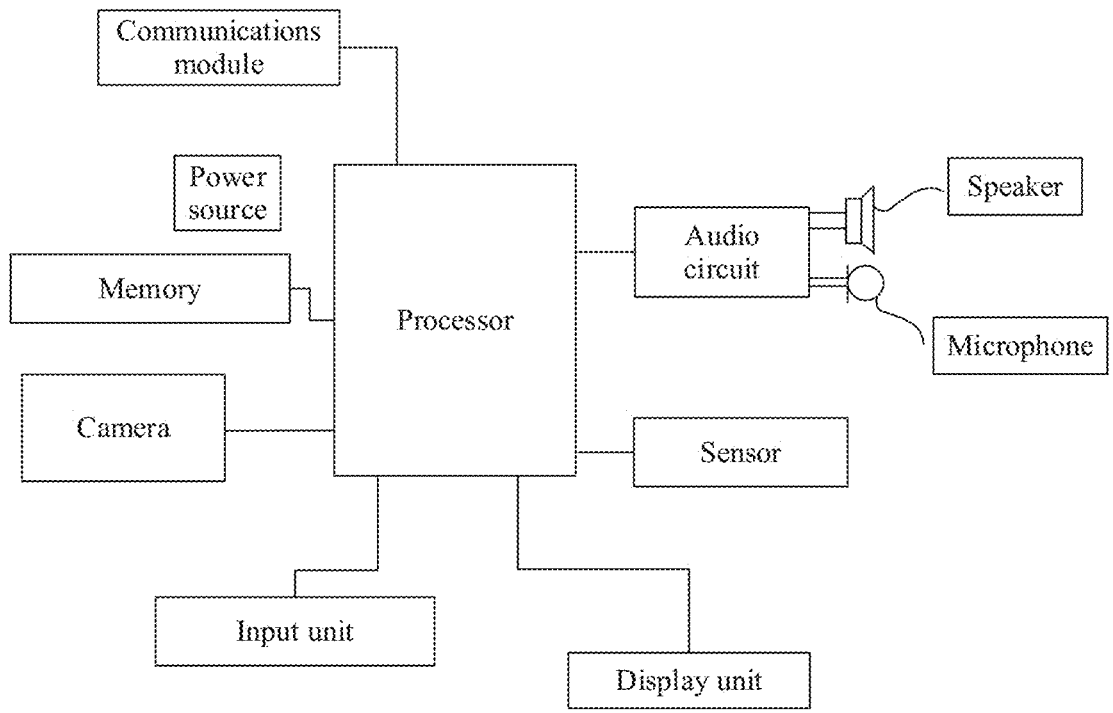
FIG. 5 is a schematic diagram of a structure of a terminal in FIG. 3.

FIG. 5 is a schematic diagram of a structure of a terminal in FIG. 3. As shown in FIG. 5, the terminal may include one or more processors and one or more memories. The memory stores instructions, and the instructions are loaded and executed by the processor to implement the method provided in the following method embodiments. Certainly, the terminal may further include components such as a communications module, an input unit, and a display unit, so as to perform input and output. The terminal may further include another component configured to implement a device function. Details are not described herein again. The terminal in the theme icon generation system performs man-machine interaction with a designer by using the input unit and the display unit, uses a theme icon designed by a designer for a system application as a theme reference icon, sends the theme reference icon to a server by using the communications module, and after the server generates a theme icon corresponding to a third-party application icon, receives the theme icon by using the communications module. Then, the theme icon is displayed by the display unit.

Figure 6:
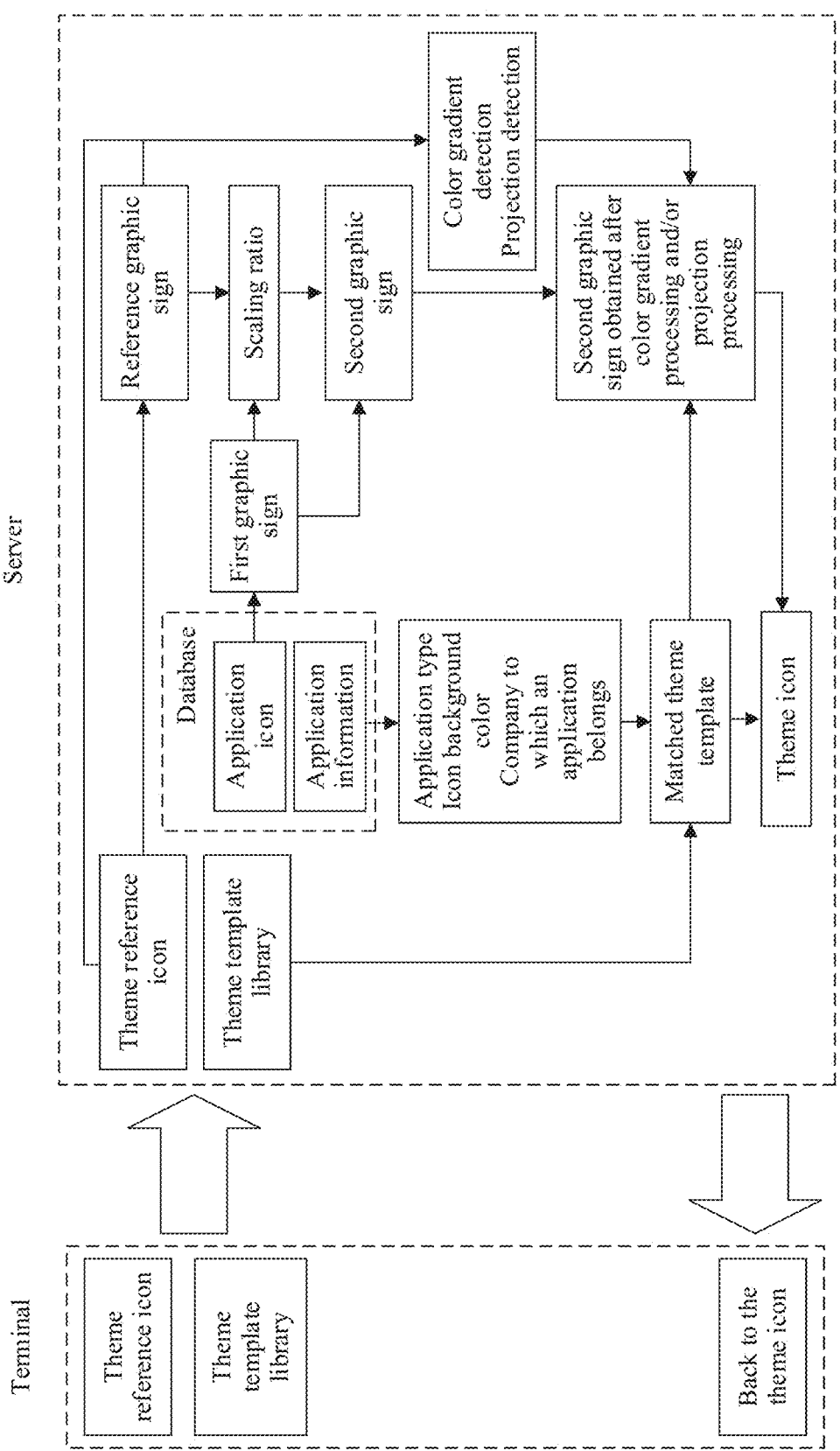
FIG. 6 is a schematic flowchart of a theme icon generation system according to an embodiment of this application.

The following describes in detail a working principle of the theme icon generation system provided in the embodiments of this application. FIG. 6 is a schematic flowchart of a theme icon generation system according to an embodiment of this application.

Figure 7:
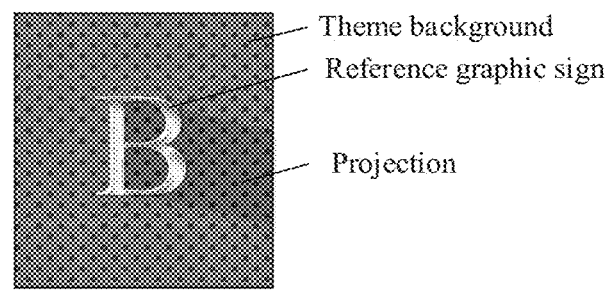
FIG. 7 is a schematic diagram of an example of a theme reference icon according to an embodiment of this application.
Figure 8:
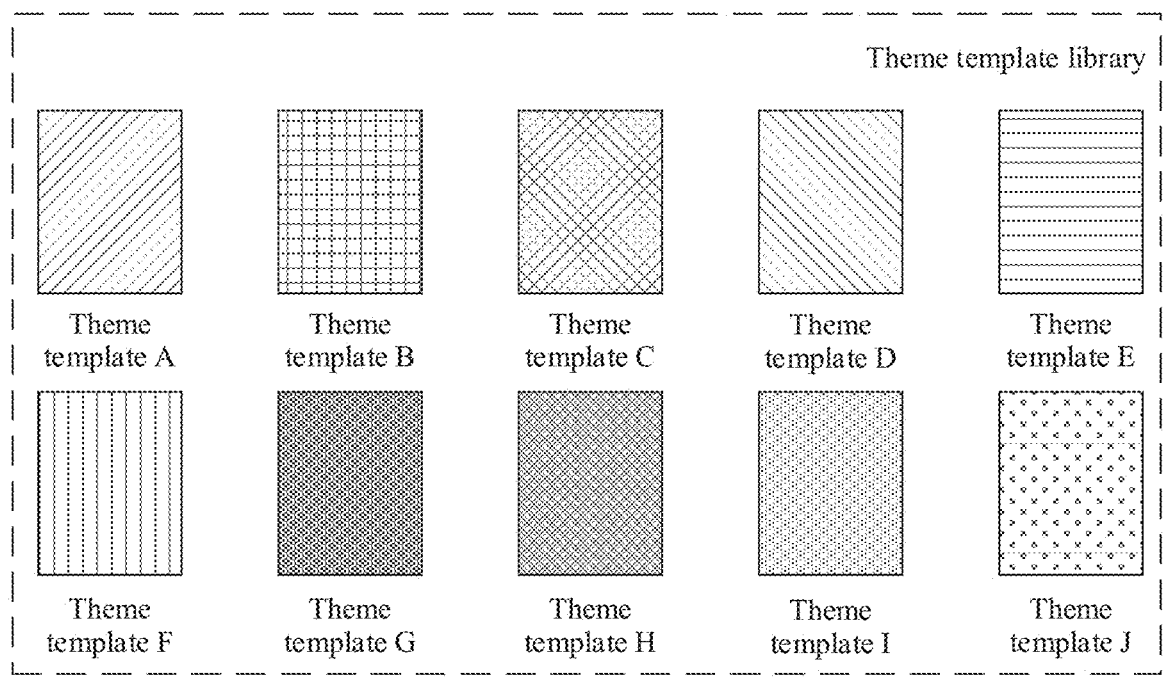
FIG. 8 is a schematic diagram of a theme template library according to an embodiment of this application.

As shown in FIG. 6, after designing the theme reference icon for the system application, the designer transmits the theme reference icon and the theme template library to the server by using the terminal. FIG. 7 is a schematic diagram of an example of a theme reference icon according to an embodiment of this application. As shown in FIG. 7, a theme reference icon designed by a designer includes a reference logo graphic, a theme background, and a projection. The reference logo graphic can distinguish the theme reference icon from another icon, and help a user identify an application corresponding to the theme reference icon. Therefore, different applications correspond to different reference logo graphic. For example, a reference logo graphic letter B in FIG. 7 is used to correspond to an application B. The theme background is a background of the reference logo graphic, making a style of the entire theme reference icon consistent with a designer's theme. In addition, in the theme reference icon in FIG. 7, the reference logo graphic may further have a projection effect, so as to enhance a stereoscopic feeling of the reference logo graphic, and the reference logo graphic may further have a color gradient effect, so as to enhance aesthetics of the theme reference icon, FIG. 8 is a schematic diagram of a theme template library according to an embodiment of this application. As shown in FIG. 8, a theme template library includes a plurality of theme templates, and different theme templates are usually similar in display styles, but have certain differences.

Figure 9:
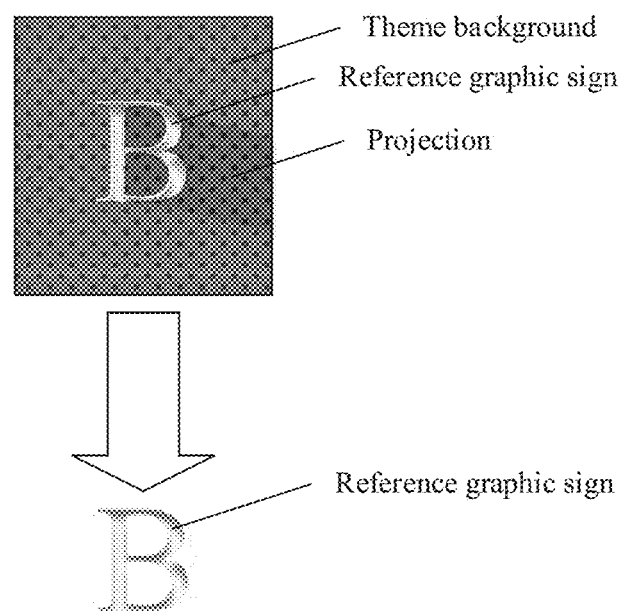
FIG. 9 is a schematic diagram of segmenting a reference logo graphic from a theme reference icon.

As shown in FIG. 6, after receiving the theme reference icon sent by the terminal, the server performs image segmentation processing on the theme reference icon, to obtain a reference logo graphic from the theme reference icon. FIG. 9 is a schematic diagram of segmenting a reference logo graphic from a theme reference icon. As shown in FIG. 9, after a theme background and a projection around the reference logo graphic in the theme reference icon are all removed, it the reference logo graphic may be obtained.

Figure 10:
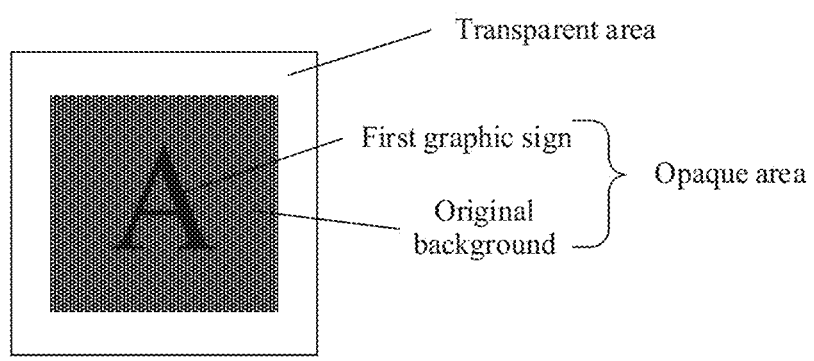
FIG. 10 is a schematic diagram of an example of an application icon.

Based on the foregoing description, it may be learned that a database is disposed on the server, and the database stores a large amount of application icons and corresponding application information. Specifically, each time a new application is released, the server may obtain the application icon and the corresponding application information from an application publishing platform. FIG. 10 is a schematic diagram of an example of an application icon. As shown in FIG. 10, the application icon has a transparent region and an opaque region, and the opaque region further includes an original background of the application icon and a first logo graphic. The first logo graphic can distinguish the application icon from another icon, and help a user identify an application corresponding to the application icon. Therefore, different applications correspond to different first logo graphic. For example, a first logo graphic letter A in FIG. 10 is used to correspond to an application A. It may be understood that an original background of the application icon is a background of the first logo graphic.

To make a display style of the application icon in FIG. 10 consistent with the theme reference icon in FIG. 7, as shown in FIG. 6, an opaque region and an original background of the application icon need to be removed, the first logo graphic needs to be retained, and the first logo graphic needs to be processed, so that the display style of the first logo graphic is the same as that of the reference logo graphic in the theme reference icon. Then a theme template is added to the theme reference icon as a background, to generate a theme icon.

Figure 11:
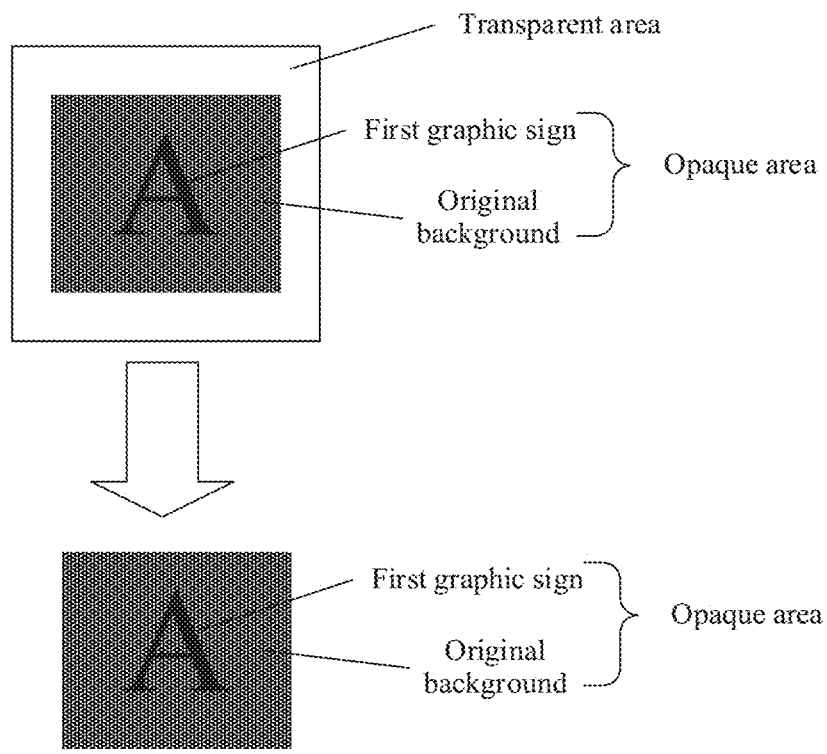
FIG. 11 is a schematic diagram of determining an opaque region from an application icon.

FIG. 11 is a schematic diagram of determining an opaque region from an application icon. As shown in FIG. 11, a server obtains an application icon from a database, performs image segmentation processing on the application icon, determines a transparent area and an opaque area of the application icon, and removes the transparent area.

Specifically, the application icon may be classified into an application icon of a vector graph and an application icon of a non-vector graph based on an image format.

For the application icon of the vector graph, each pixel in the vector graph indicates transparency of the pixel by using a transparency channel. Therefore, the transparency channel may be directly extracted to determine whether the pixel belongs to the opaque region. For the application icon, the transparent region surrounds the opaque region, that is, the opaque region is a whole that is connected to each other. Therefore, the opaque region may be determined by using an image connected region detection method.

It should be understood that the application icon of the vector graph has a parameter of a transparency channel. Therefore, the transparency channel of the application icon can be directly extracted, so as to determine the transparent area and the opaque area in the application icon. The application icon of the non-vector graph needs to be determined in another manner.

For the application icon of the non-vector image, transparency of a pixel cannot be directly obtained based on a transparency channel. Therefore, binarization processing needs to be performed on the application icon to determine the opaque region. The binarization processing refers to setting a grayscale value of a pixel on the image to 0 or 255.

It should be particularly noted that each image includes pixels arranged in an array. A grayscale value of each pixel is related to luminance. A grayscale value ranges from 0 to 255. A larger grayscale value indicates higher luminance. A smaller grayscale value indicates lower luminance. Therefore, a grayscale value corresponding to the opaque region is far less than a grayscale value corresponding to the transparent region.

In order to distinguish the opaque region from the transparent region, binarization processing is performed on pixels in the application icon, that is, a grayscale threshold is selected. For a pixel whose grayscale value is less than the grayscale threshold, the grayscale value of the pixel is set to 0. For a pixel whose grayscale value is greater than the grayscale threshold, the grayscale value of the pixel is set to 255. Then, a pixel whose grayscale value is 0 is used as a pixel of the opaque region, so as to determine the opaque region.

Figure 12:
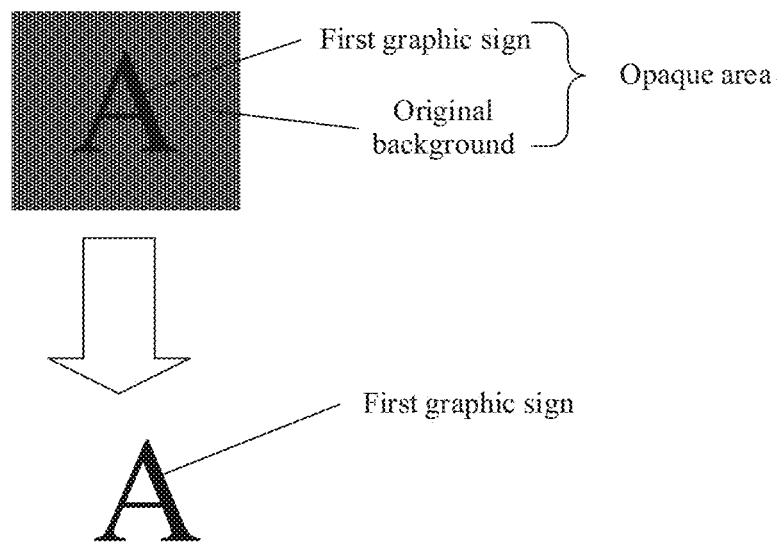
FIG. 12 is a schematic diagram of segmenting a first logo graphic from an opaque region.

FIG. 12 is a schematic diagram of segmenting a first logo graphic from an opaque region. As shown in FIG. 12, after the opaque region is determined, image segmentation processing needs to be further performed on the opaque region, and the first logo graphic and an original background are segmented, to generate the first logo graphic. The image segmentation processing on the opaque region may be performed by using a machine learning method or a deep learning method.

Figure 13:
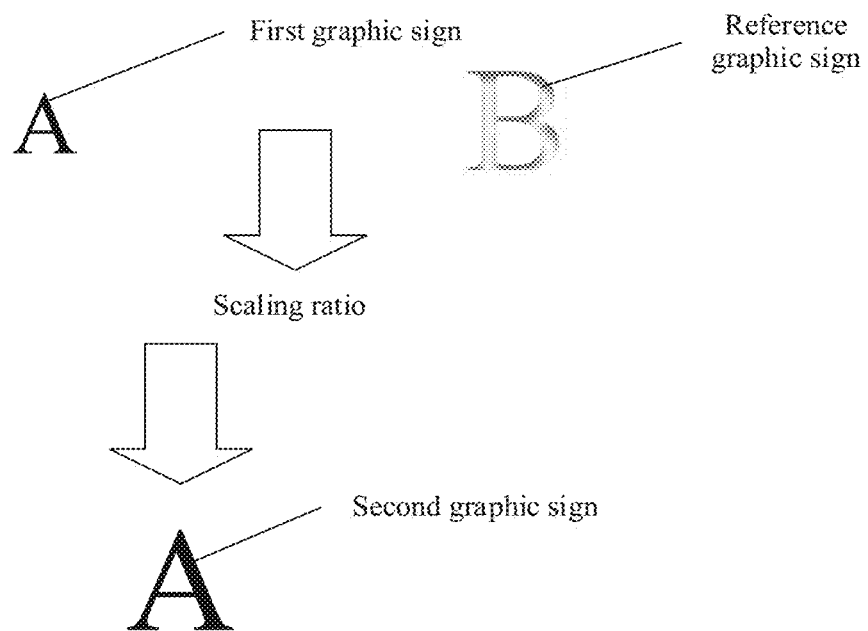
FIG. 13 is a schematic diagram of scaling a first logo graphic to generate a second logo graphic.

FIG. 13 is a schematic diagram of scaling a first logo graphic to generate a second logo graphic. As shown in FIG. 13, a scaling ratio corresponding to each first logo graphic is calculated based on a size ratio of the reference logo graphic and a size ratio of a first logo graphic, and each first logo graphic is scaled to generate a corresponding second logo graphic, so that a size of the second logo graphic is the same as that of the reference logo graphic.

It may be understood that sizes of first logo graphics obtained by segmenting different application icons are different. To keep styles of generated theme icons consistent, the sizes of the first logo graphics need to be adjusted to a uniform size. Certainly, if the size of the first logo graphic relative to the size of the reference logo graphic meets a requirement, the scaling may not be necessary.

Specifically, in a possible implementation, the size of the first logo graphic is compared with the size of the reference logo graphic. Based on a comparison result, the first logo graphic is scaled by using an interpolation algorithm, so that the size of the second logo graphic is the same as the size of the reference logo graphic.

It should be noted that, because there is a difference between an aspect ratio of the first logo graphic and an aspect ratio of the reference logo graphic, when the scaling ratio of the first logo graphic is calculated, a width ratio and a height ratio of the reference logo graphic and the first logo graphic may be separately calculated first. The larger value is then used as the scaling ratio, or the smaller value is used as the scaling ratio.

When selecting the interpolation algorithm, any one of image difference methods such as a nearest neighbor interpolation method, bilinear interpolation method, and cubic interpolation method may be selected.

The nearest neighbor interpolation algorithm assigns a grayscale value of a pixel closest to the original pixel to an original pixel, and the bilinear interpolation method is an extension of a linear difference algorithm, and performs linear difference in two directions respectively. The cubic interpolation method is to perform weighted interpolation on grayscale values of 16 pixels around a target pixel to obtain a grayscale value of the target pixel.

Figure 14:
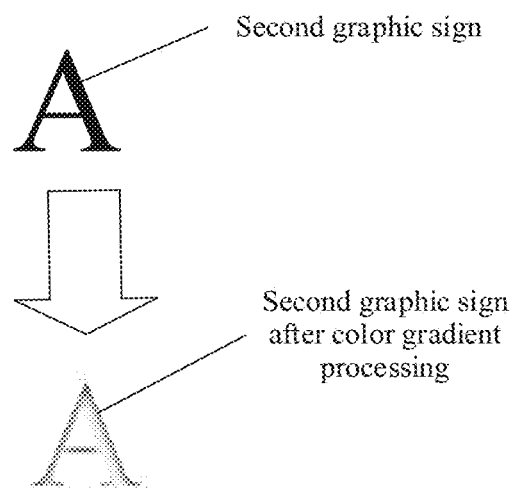
FIG. 14 is a schematic diagram of performing color gradient processing on a second logo graphic.
Figure 15:
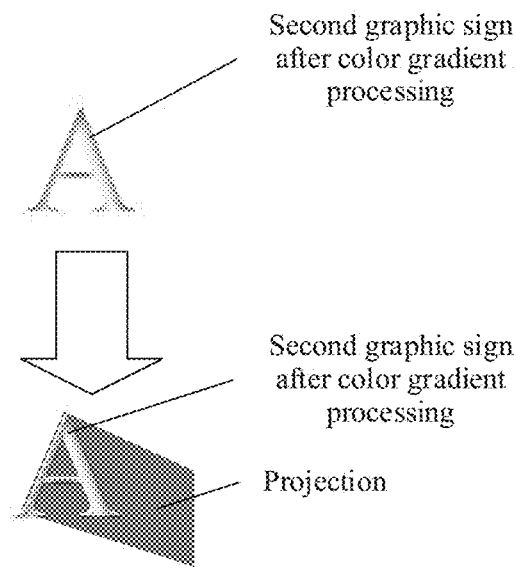
FIG. 15 is a schematic diagram of performing projection processing on a second logo graphic obtained after color gradient processing.

FIG. 14 is a schematic diagram of performing color gradient processing on a second logo graphic. FIG. 15 is a schematic diagram of performing projection processing on a second logo graphic obtained after color gradient processing.

It should be noted that, to determine whether a color gradient exists in the reference logo graphic, in a possible implementation, the determining may be performed by analyzing a color quantity and a hue distribution of the reference logo graphic.

Specifically, a color histogram corresponding to the reference logo graphic may be generated, where the color histogram collects statistics on colors of pixels in the reference logo graphic, and performs display in a form of the color histogram. The color histogram can directly display the color quantity and hue distribution corresponding to the reference logo graphic.

It may be understood that if a color gradient exists in the reference logo graphic, each color that forms the color gradient appears in the color histogram, a color quantity is relatively, large, and a color difference between different colors is relatively small.

When the color quantity is less than or equal to a first preset threshold, it is determined that the reference logo graphic is monochrome, and that no color gradient exists. When the color quantity is greater than the first preset threshold, and the color difference between two colors is less than a second preset threshold, it is determined that a color gradient exists in the reference logo graphic. When the color quantity is greater than the first preset threshold, and a color difference between any two colors is greater than or equal to the second preset threshold, it is determined that the reference logo graphic includes a plurality of colors, and that no color gradient exists.

To determine whether a projection exists in the reference logo graphic, in a possible implementation, the determining may be performed by analyzing an edge of the reference logo graphic and a straight line in a theme reference icon. Specifically, edge detection may be first performed on the reference logo graphic to determine the edge of the reference logo graphic, and then straight line detection is performed on the theme reference icon to obtain the straight line in the theme reference icon. The edge is compared with the straight line, and the projection of the reference logo graphic is determined based on a comparison result.

It should be noted that, because there is an obvious boundary between the projection and the reference logo graphic, and the projection and the reference logo graphic are not connected, when edge detection is performed on the reference logo graphic, the projection of the reference logo graphic is excluded, and when straight line detection is performed on the theme reference icon, the projected straight line can be detected together. If a straight line in straight lines of the theme reference icon does not belong to the edge of the reference logo graphic, the straight line belongs to the projection of the reference logo graphic, and it may be determined that the reference logo graphic has a projection.

It may be understood that when all straight lines belong to the edge of the reference logo graphic, it is determined that the reference logo graphic has no projection. When there is a straight line that does not belong to the edge of the reference logo graphic, it is determined that the reference logo graphic has a projection.

Further, after it is determined that the reference logo graphic has a projection, a length and a direction of the projection are calculated based on the straight line that does not belong to the edge.

Specifically, the length of the projection and a width or a height of the reference logo graphic may be detected, and a projection proportion may be calculated. An angle formed between the projection and the reference logo graphic can be detected, and the direction of the projection can be calculated.

It may be understood that, after the color gradient status of the reference logo graphic and the projection status of the reference logo graphic are determined, corresponding processing needs to be performed on the second logo graphic, so that the processed second logo graphic has a color gradient and/or a projection.

Specifically, a projection length of the second logo graphic is calculated based on a width or height of the second logo graphic and the projection proportion, and the projection of the second logo graphic is generated with reference to the direction of the projection.

It should be understood that because the theme reference icon in FIG. 7 has a projection, and the reference logo graphic has a color gradation. Correspondingly, color gradient processing and projection processing need to be performed on the second logo graphic. As shown in FIG. 14, after the color gradient processing is performed on the second logo graphic, a color gradient exists in the second logo graphic, and the color is consistent with the reference logo graphic in the theme reference icon in FIG. 7. As shown in FIG. 15, after the projection processing is performed on the second logo graphic obtained after the color gradient processing, a color gradient and a projection exist in the second logo graphic, and the projection is consistent with the projection in the theme reference icon in FIG. 7.

It may be understood that a display style of the second logo graphic obtained after the color gradient processing and the projection processing is very close to a display style of the theme reference icon in FIG. 7, and a theme template further needs to be selected as a theme background, that is, a theme icon whose display style is consistent with the display style of the theme reference icon can be generated.

Figure 16:
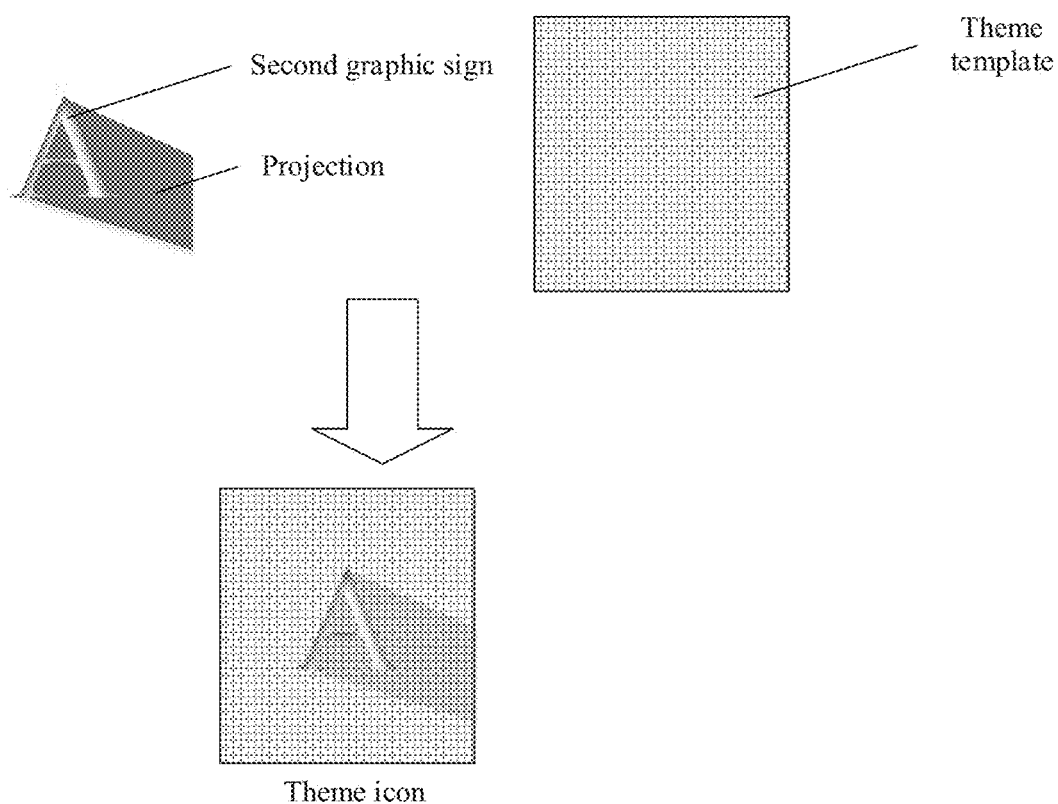
FIG. 16 is a schematic diagram of fusing a second logo graphic with a theme template to generate a theme icon.

FIG. 16 is a schematic diagram of fusing a second logo graphic with a theme template to generate a theme icon. As shown in FIG. 16, each second logo graphic is matched based on application information stored in a database, a corresponding theme template is determined from a theme template library, and the second logo graphic is fused with the theme template to generate the theme icon. The generated theme icon is returned to a designer's terminal to realize the generation of the theme icon.

The application information includes at least one of an application category, an icon background color, and a company to which an application belongs. For example, an application category includes business office, sports and health, auxiliary tools, leisure and entertainment, the icon background color is a color of an opaque area in an application icon, and the company to which the application belongs include Baidu-Alibaba, Tencent, Toutiao, and the like.

It should be noted that the theme template is stored in the theme template library, and the theme template library may be input by a user from a terminal, or may be generated based on a theme reference icon.

In order to match a proper theme template from the theme template library, a first possible implementation is to classify, based on the application category, second logo graphics corresponding to the application icon, and second logo graphics in a same application category use a same theme template.

In a second possible implementation, based on the icon background color, theme template matching is performed on the second logo graphic corresponding to the application icon, and a theme template that is closest to the icon background color is selected from the theme template library.

In a third possible implementation, the second logo graphic corresponding to the application icon is classified based on the company to which the application belongs, and the second logo graphic corresponding to the same company uses a same theme template.

When the second logo graphic and the theme template are fused, different fusion manners may be used. Specifically, different fusion manners may be selected based on graphic complexity of the second logo graphic.

It may be understood that, for a second logo graphic with relatively low graphic complexity, there is no obvious overlap trace when the second logo graphic is directly superimposed with the theme template. However, for a second logo graphic with relatively high graphic complexity, there is an obvious overlap trace when the second logo graphic is directly superimposed with the theme template.

Therefore, to improve a visual effect of the generated theme icon, the second logo graphic may be fused with the theme template based on graphic complexity. First, the graphic complexity of the second logo graphic is detected, where the graphic complexity may be measured by using a ratio of a perimeter to an area of the graphic. A larger ratio of the perimeter to the area indicates a lower graphic complexity, and a lower ratio of the perimeter to the area indicates a higher graphic complexity.

When the graphic complexity is less than a third preset threshold, the second logo graphic is superimposed on the theme template to generate the theme icon. When the graphic complexity is less than the third preset threshold, the second logo graphic is directly superimposed with the theme template, and there is no obvious overlap trace. To simplify an entire theme icon generation method, the second logo graphic may be superimposed on the theme template.

When the graphic complexity is greater than or equal to the third preset threshold, poisson blending is performed on the second logo graphic and the theme template, to generate the theme icon. When the graphic complexity is greater than or equal to the third preset threshold, poisson blending is performed on the second logo graphic and the theme template, so as to reduce an overlap trace between the second logo graphic and the theme template.

It should be noted that the foregoing server can further generate a plurality of theme icons in batches. Specifically, the foregoing server obtains a plurality of application icons in batches from a database, segments corresponding first logo graphics from the application icons in hatches, calculates a scaling ratio corresponding to each first logo graphic in batches, and performs batch scaling on each first logo graphic, to generate a corresponding second logo graphic. After color gradient detection and projection detection are performed on the reference logo graphic, corresponding color gradient processing and projection processing are performed on a plurality of second logo graphic in batches. Batch matching is performed on each second logo graphic based on the application information stored in the application icon database, to determine a corresponding theme template, and then each second logo graphic is fused with the theme template in batches to generate a theme icon. A generated plurality of theme icons are returned to the designer's terminal in batches, so that the theme icons are generated in hatches.

Based on the foregoing description of the theme icon generation system, it can be learned that, in the theme icon generation system, the server mainly receives the theme reference icon and the theme template library from the terminal, processes the application icon, generates a corresponding theme icon, and returns the theme icon to the terminal.

In other words, in the entire theme icon generation system, the terminal is mainly configured to interact with a designer, and the theme icon generation method is performed by the server.

Figure 17:
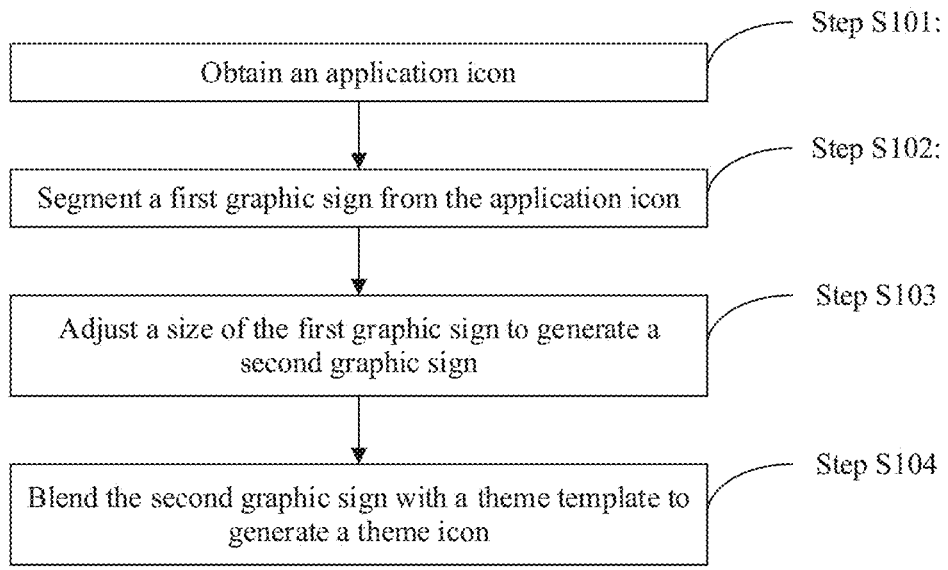
FIG. 17 is a schematic flowchart of a theme icon generation method according to an embodiment of this application.

Based on the foregoing description, it may be learned that an embodiment of this application proposes a theme icon generation method. FIG. 17 is a schematic flowchart of a theme icon generation method according to an embodiment of this application. As shown in FIG. 17, the method includes the following steps:

Step S101: Obtain an application icon.

Step S102: Segment a first logo graphic from the application icon.

Figure 18:
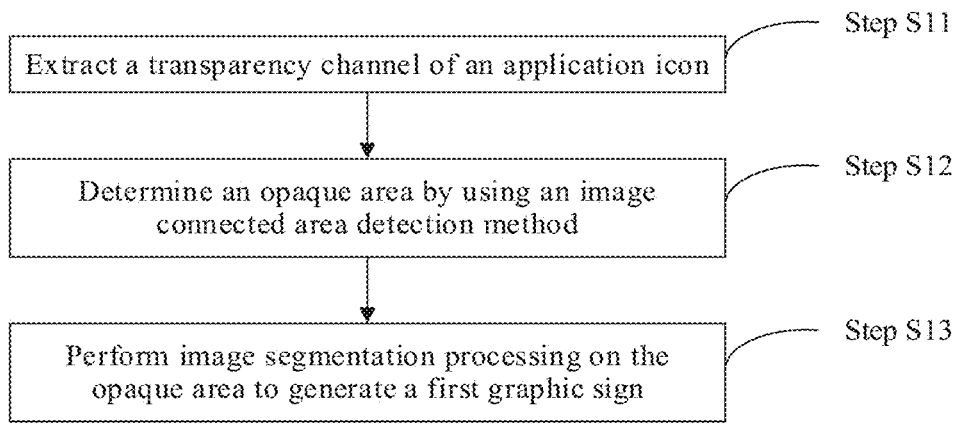
FIG. 18 is a flowchart of an opaque region determining method from an application icon in a vector graph.

For an application icon of a vector graph, in a possible implementation, FIG. 18 is a flowchart of an opaque region determining method from the application icon of the vector graph. The method includes the following steps:

Step S11: Extract a transparency channel of the application icon.

Step S12: Determine an opaque region by using an image connected region detection method.

Step S13: Perform image segmentation processing on the opaque region to generate a first logo graphic.

Figure 19:
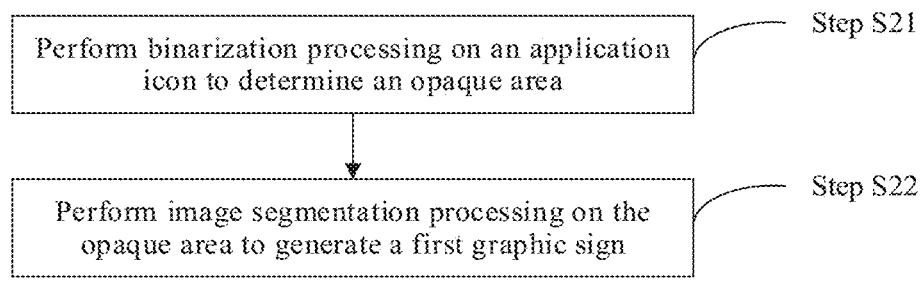
FIG. 19 is a flowchart of an opaque region determining method from an application icon in a non-vector graph.

For an application icon in a non-vector graph, transparency of a pixel cannot be directly obtained based on a transparency channel. In a possible implementation, FIG. 19 is a flowchart of an opaque region determining method from an application icon in a non-vector graph. The method includes the following steps:

Step S21: Perform binarization processing on the application icon to determine an opaque region.

Step S22: Perform image segmentation processing on the opaque region to generate a first logo graphic.

Step S103: Adjust a size of the first logo graphic to generate a second logo graphic.

Step S104: Fuse the second logo graphic with a theme template to generate a theme icon.

In conclusion, according to the theme icon generation method provided in this embodiment of this application, the application icon is obtained. The application icon includes a transparent area and the opaque area, and the opaque area includes an icon background and the first logo graphic. The first logo graphic is segmented from the application icon, and a size of the first logo graphic is adjusted to generate the second logo graphic. The second logo graphic is fused with the theme template to generate a theme icon. In this way, the first logo graphic is segmented from the opaque area of the application icon, the second logo graphic obtained after the size of the first logo graphic is adjusted is fused with the theme template, the application icon is converted into a theme icon consistent with a theme style, and the application icon can be automatically converted into the theme icon. In addition, the generated theme icon has no overlap trace.

Figure 20:
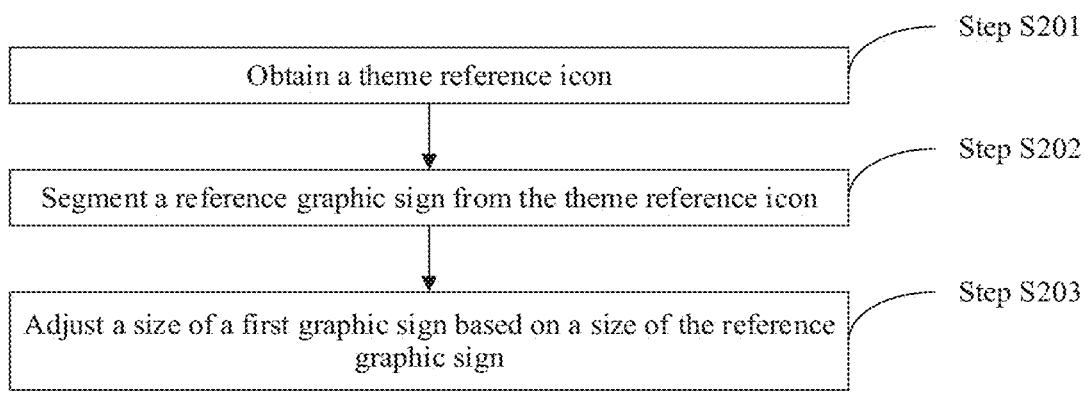
FIG. 20 is a schematic flowchart of adjusting a size of a first logo graphic.

To describe more clearly how the size of the first logo graphic is adjusted in this embodiment of this application, step S103 is described in detail below. FIG. 20 is a schematic flowchart of adjusting the size of the first logo graphic. Based on the method process shown in FIG. 17, as shown in FIG. 20, Step S103 of adjusting the size of the first logo graphic to generate the second logo graphic includes the following steps:

Step S201: Obtain a theme reference icon.

Step S202: Segment a reference logo graphic from the theme reference icon.

Step S203: Adjust the size of the first logo graphic based on a size of the reference logo graphic.

Figure 21:
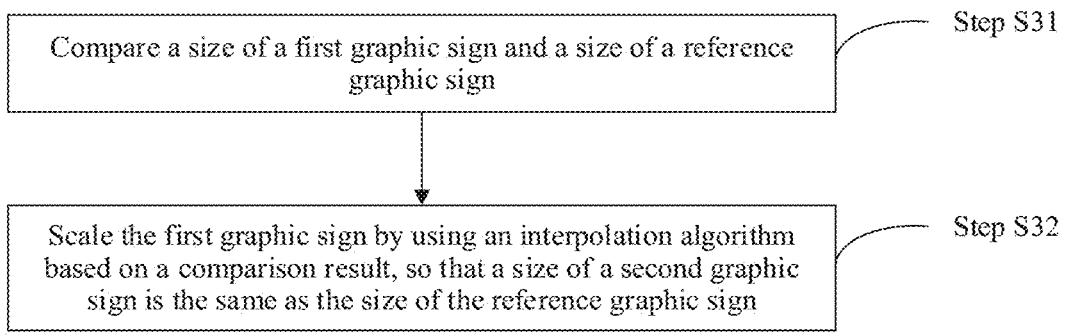
FIG. 21 is a schematic flowchart of adjusting a size of a first logo graphic based on a reference logo graphic.

To adjust the size of the first logo graphic, in a possible implementation, FIG. 21 is a schematic flowchart of adjusting the size of the first logo graphic according to the reference logo graphic. As shown in FIG. 21, step S203 of adjusting the size of the first logo graphic, based on the size of the reference logo graphic includes the following steps:

Step S31: Compare the size of the first logo graphic with the size of the reference logo graphic.

Step S32: Based on a comparison result, scale the first logo graphic by using an interpolation algorithm, so that the size of the second logo graphic is the same as the size of the reference logo graphic.

Figure 22:
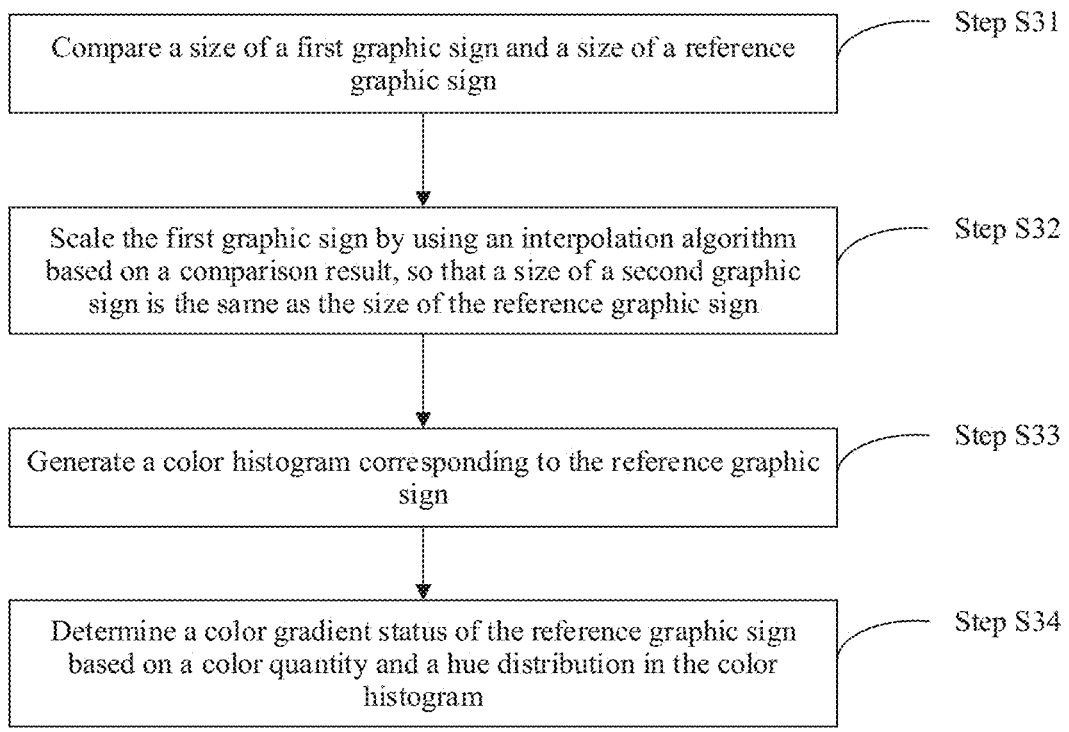
FIG. 22 is a schematic flowchart of determining a color gradient status of a reference logo graphic.

In addition, to enhance beauty of a theme icon, when designing a corresponding theme icon for a system application, a designer designs the theme icon as a gradient color style. In this case, to keep a display style of an entire interface corresponding to a theme consistent, in a possible implementation, FIG. 22 is a schematic flowchart of determining a color gradient status of a reference logo graphic. As shown in FIG. 22, based on the process shown in FIG. 21, after step S32 of scaling, based on a comparison result, the first logo graphic by using an interpolation algorithm, so that the size of the second logo graphic is the same as the size of the reference logo graphic, the process further includes the following steps:

Step S33: Generate a color histogram corresponding to the reference logo graphic.

Step S34: Determine a color gradation status of the reference logo graphic based on a color quantity and a hue distribution in the color histogram.

Figure 23:
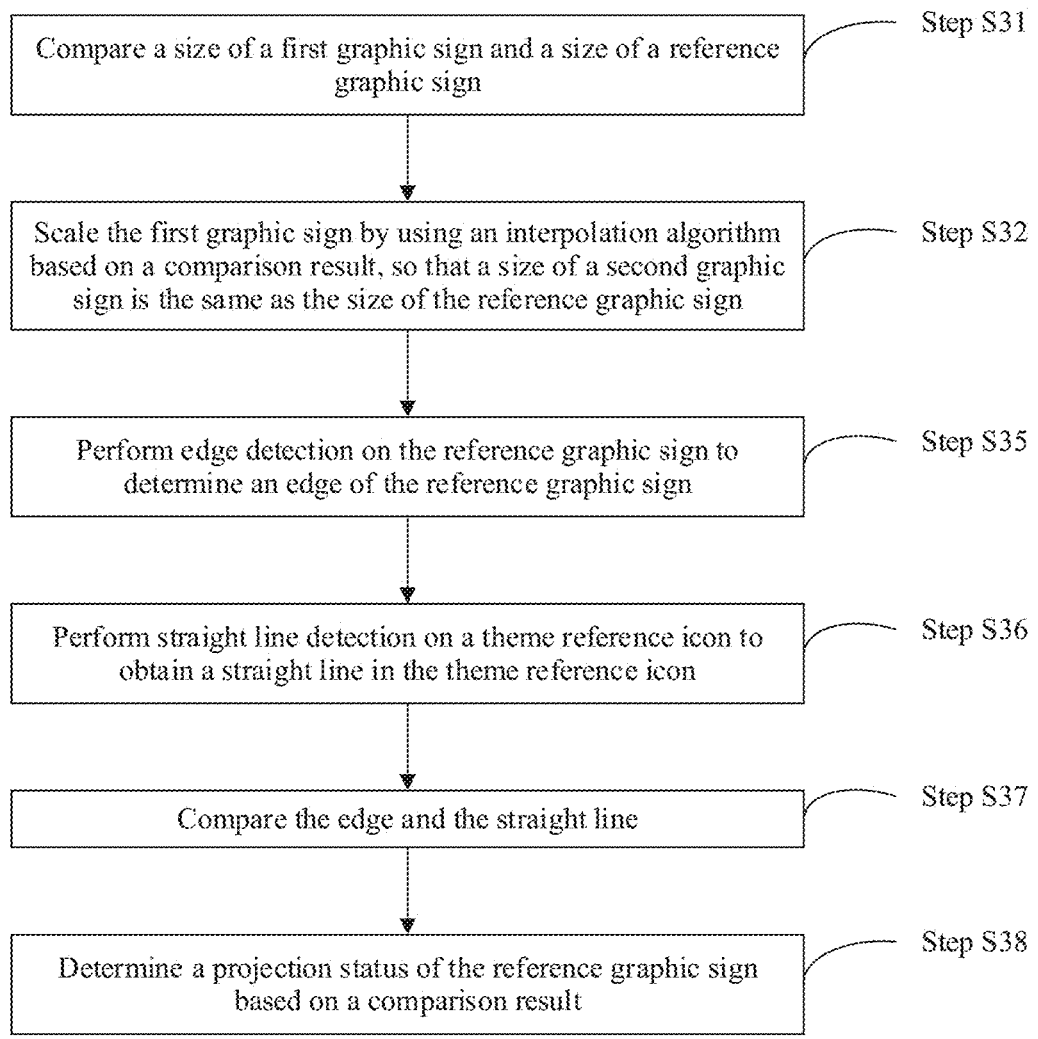
FIG. 23 is a schematic flowchart of determining a projection status of a reference logo graphic.

In addition, to enhance beauty of a theme icon, when designing a corresponding theme icon for a system application, a designer designs the theme icon in a projection style. In this case, to keep a display style of an entire interface corresponding to a theme consistent, in a possible implementation, FIG. 23 is a schematic flowchart of determining a projection status of a reference logo graphic. As shown in FIG. 23, based on the process shown in FIG. 21, after step S32 of scaling, based on a comparison result, the first logo graphic by using an interpolation algorithm, so that the size of the second logo graphic is the same as the size of the reference logo graphic, the process further includes the following steps:

Step S35: Perform edge detection on the reference logo graphic to determine an edge of the reference logo graphic.

Step S36: Perform straight line detection on a theme reference icon, to obtain a straight line in the theme reference icon.

Step S37: Compare the edge with the straight line.

Step S38: Determine a projection status of the reference logo graphic based on a comparison result.

In addition, before step S104 of fusing the second logo graphic with the theme template to generate the theme icon, the process further includes: performing color gradient processing and projection processing on the second logo graphic based on the color gradient status of the reference logo graphic and the projection status of the reference logo graphic.

Therefore, the size of the first logo graphic is adjusted based on the size of the reference logo graphic, so that the size of the generated second logo graphic is the same as that of the reference logo graphic, and a style of the generated theme icon is consistent.

Figure 24:
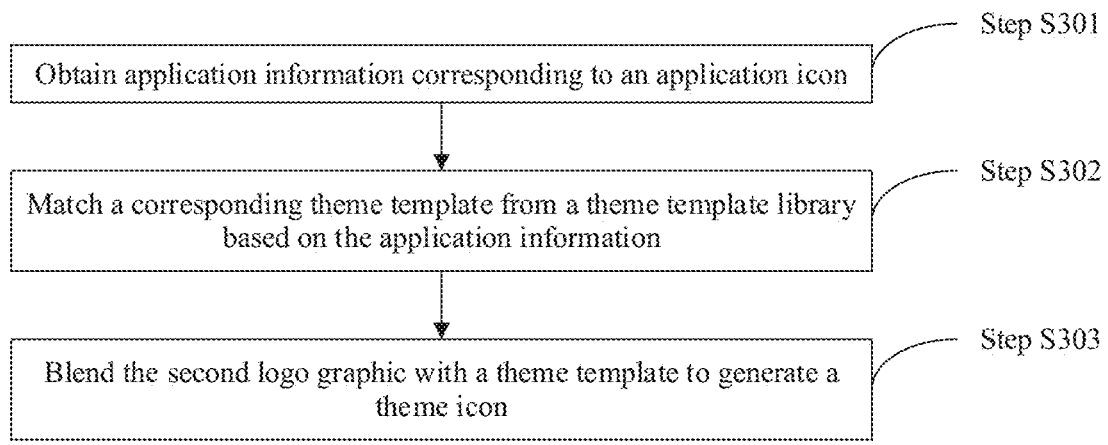
FIG. 24 is a schematic flowchart of fusing a second logo graphic with a theme template.

To describe more clearly, in the theme icon generation method provided in this embodiment of this application, how different second logo graphics are fused with different theme templates. FIG. 24 is a schematic flowchart of fusing the second logo graphics with the theme template, as shown in FIG. 24. Based on the method process shown in FIG. 17, step S104 of fusing the second logo graphic with the theme template to generate the theme icon includes the following steps:

Step S301: Obtain application information corresponding to an application icon.

Step S302: Match a corresponding theme template from a theme template library based on the application information.

Step S303: Fuse the second logo graphic with the theme template to generate the theme icon.

Figure 25:
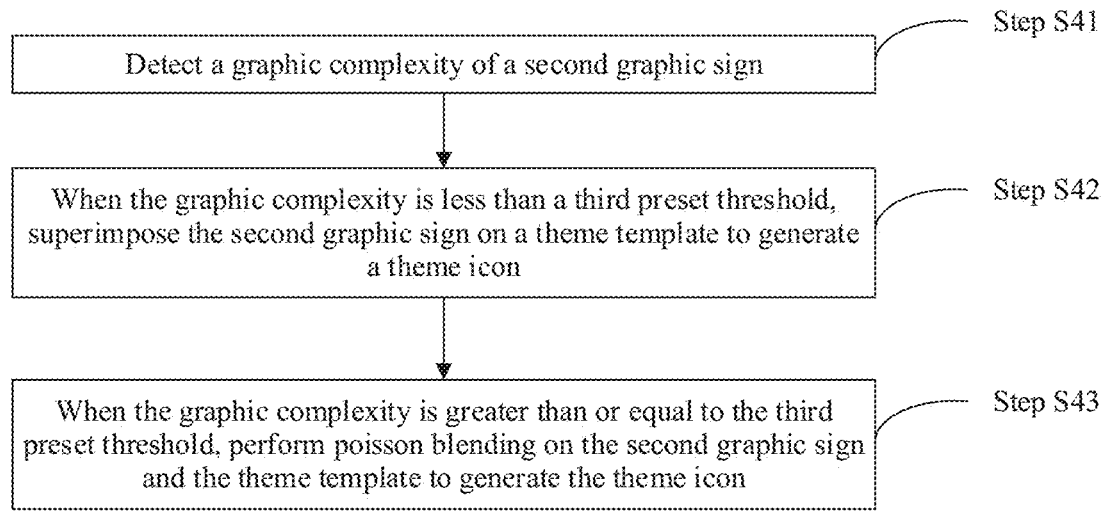
FIG. 25 is a schematic flowchart of fusing a second logo graphic with a theme template based on a graphic complexity.

To improve a visual effect of the generated theme, icon, in a possible implementation, FIG. 25 is a schematic flowchart of fusing the second logo graphic with the theme template based on a graphic complexity. As shown in FIG. 25, based on the process shown in FIG. 24, step S303 of fusing the second logo graphic with the theme template to generate the theme icon includes the following steps:

Step S41: Detect a graphic complexity of the second logo graphic.

Step S42: When the graphic complexity is less than a third preset threshold, superimpose the second logo graphic on the theme template, to generate the theme icon.

Step S43: When the graphic complexity is greater than or equal to the third preset threshold, poisson blending is performed on the second logo graphic and the theme template, to generate the theme icon.

Therefore, the theme template corresponding to the second logo graphic is matched based on application information corresponding to an application icon, to generate the theme icon.

Figure 26:
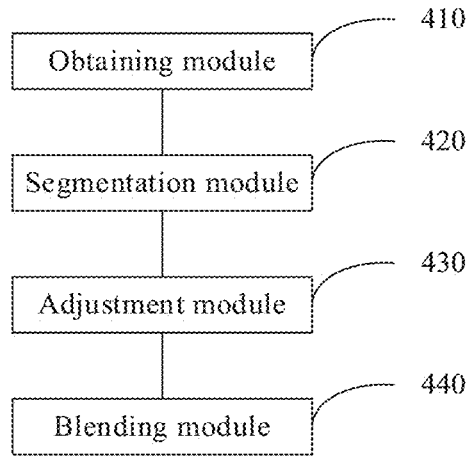
FIG. 26 is a schematic diagram of a structure of a theme icon generation apparatus according to an embodiment of this application.

To implement the foregoing embodiments, an embodiment of this application further provides a theme icon generation apparatus. FIG. 26 is a schematic diagram of a structure of a theme icon generation apparatus according to an embodiment of this application. As shown in FIG. 26, the apparatus includes: an obtaining module 410, a segmentation module 420, an adjustment module 430, and a fusion module 440.

The obtaining module 410 is configured to obtain an application icon.

The application icon includes a transparent area and the opaque area, and the opaque area includes an icon background and the first logo graphic.

The segmentation module 420 is configured to segment the first logo graphic from the application icon.

The adjustment module 430 is configured to adjust a size of the first logo graphic, to generate a second logo graphic.

The fusion module 440 is configured to fuse the second logo graphic with a theme template to generate a theme icon.

Further, in order to segment the first logo graphic from the application icon, in a possible implementation, the segmentation module 420 includes a first processing submodule 421, configured to perform binarization processing on the application icon, so as to determine the opaque area. The second processing submodule 422 is configured to perform image segmentation processing on the opaque region to generate the first logo graphic.

It should be noted that the foregoing explanations and descriptions of the embodiment of the theme icon generation method are also applicable to the theme icon generation apparatus in this embodiment of this application. Details are not described herein again.

In conclusion, the theme icon generation apparatus provided in this embodiment of this application obtains an application icon when generating a theme icon. The application icon includes a transparent area and the opaque area, and the opaque area includes an icon background and the first logo graphic. The first logo graphic is segmented from the application icon, and a size of the first logo graphic is adjusted to generate the second logo graphic. The second logo graphic is fused with the theme template to generate a theme icon. In this way, the first logo graphic is segmented from the opaque area of the application icon, the second logo graphic obtained after the size of the first logo graphic is adjusted is fused with the theme template, the application icon is converted into a theme icon consistent with a theme style, and the application icon can be automatically converted into the theme icon. In addition, the generated theme icon has no overlap trace.

Figure 27:
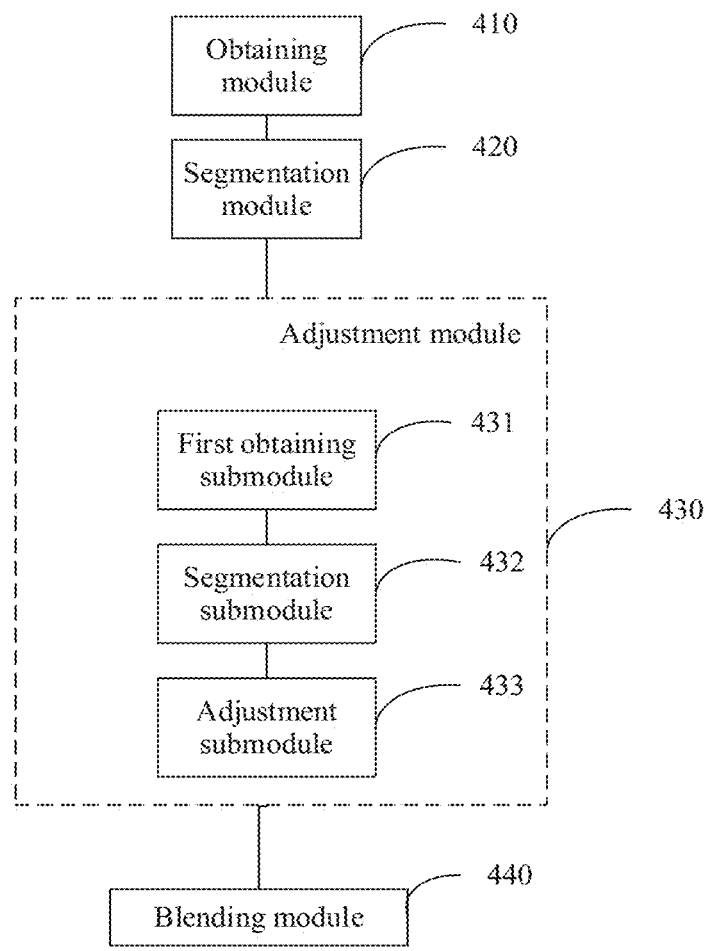
FIG. 27 is a schematic diagram of a first structure of a theme icon generation apparatus in FIG. 26.

FIG. 27 is a schematic diagram of a first structure of a theme icon generation apparatus in FIG. 26. As shown in FIG. 27, based on the apparatus structure shown in FIG. 26, the adjustment module 430 includes: a first obtaining submodule 431, a segmentation submodule 432, and an adjustment submodule 433.

The first obtaining submodule 431 is configured to obtain a theme reference icon.

The segmentation submodule 432 is configured to segment a reference logo graphic from the theme reference icon.

The adjustment submodule 433 is configured to adjust a size of a first logo graphic based on a size of the reference logo graphic.

Further, to adjust the size of the first logo graphic, in a possible implementation, the adjustment submodule 433 includes a comparison unit 4331, configured to compare the size of the first logo graphic with the size of the reference logo graphic. A scaling unit 4332 is configured to scale, based on a comparison result, the first logo graphic by using an interpolation algorithm, so that a size of the second logo graphic is the same as the size of the reference logo graphic.

Further, to keep a display style of an entire interface corresponding to a theme consistent, in a possible implementation, the adjustment submodule 433 further includes: a generation unit 4333, configured to generate a color histogram corresponding to the reference logo graphic; and a first determining unit 4334, configured to determine a color gradient status of the reference logo graphic based on a color quantity and a hue distribution in the color histogram.

Further, to determine whether a color gradient exists in the reference logo graphic, in a possible implementation, the first determining unit 4334 includes: a first determining subunit 4334a, configured to determine that when a color quantity is less than or equal to a first preset threshold, the reference logo graphic is monochrome, and that no color gradient exists; a second determining subunit 4334b, configured to: when a color quantity is greater than the first preset threshold, and a color difference between two colors is less than a second preset threshold, determine that the color gradient exists in the reference logo graphic; and a third determining subunit 4334c, configured to: when the color quantity is greater than the first preset threshold, and a color difference between any two colors is greater than or equal to the second preset threshold, determine that the reference logo graphic includes a plurality of colors, and that no color gradient exists.

Further, to keep a display style of an entire interface corresponding to a theme consistent, in a possible implementation, the adjustment submodule 433 further includes: a first detection unit 4335, configured to perform edge detection on the reference logo graphic, to determine an edge of the reference logo graphic; a second detection unit 4336, configured to perform straight line detection on the reference logo graphic, to obtain a straight line in the reference logo graphic; a comparison unit 4337, configured to compare the edge with the straight line; and a second determining unit 4338, configured to determine a projection status of the reference logo graphic based on a comparison result.

Further, to determine whether the reference logo graphic has a projection, in a possible implementation, the second determining unit 4338 includes: a fourth determining subunit 4338a, configured to: when all straight lines are part of the edge, determine that the reference logo graphic has no projection; and a fifth determining subunit 4338b, configured to: when the straight line is not part of the edge, determine that the reference logo graphic has a projection.

Further, to determine a projection parameter of the second logo graphic, in a possible implementation, the second determining unit 4338 further includes: a calculation subunit 4338c, configured to calculate a projection proportion and a direction based on the straight line that is not part of the edge.

Further, to perform color gradient processing and/or projection processing on the second logo graphic, the apparatus further includes: a processing module 450, configured to perform color gradient processing and projection processing on the second logo graphic based on the color gradient status of the reference logo graphic and the projection status of the reference logo graphic.

It should be noted that the foregoing explanations and descriptions of the embodiment of the theme icon generation method are also applicable to the theme icon generation apparatus in this embodiment of this application. Details are not described herein again.

Therefore, the size of the first logo graphic is adjusted based on the size of the reference logo graphic, so that the size of the generated second logo graphic is the same as that of the reference logo graphic, and a style of the generated theme icon is consistent.

Figure 28:
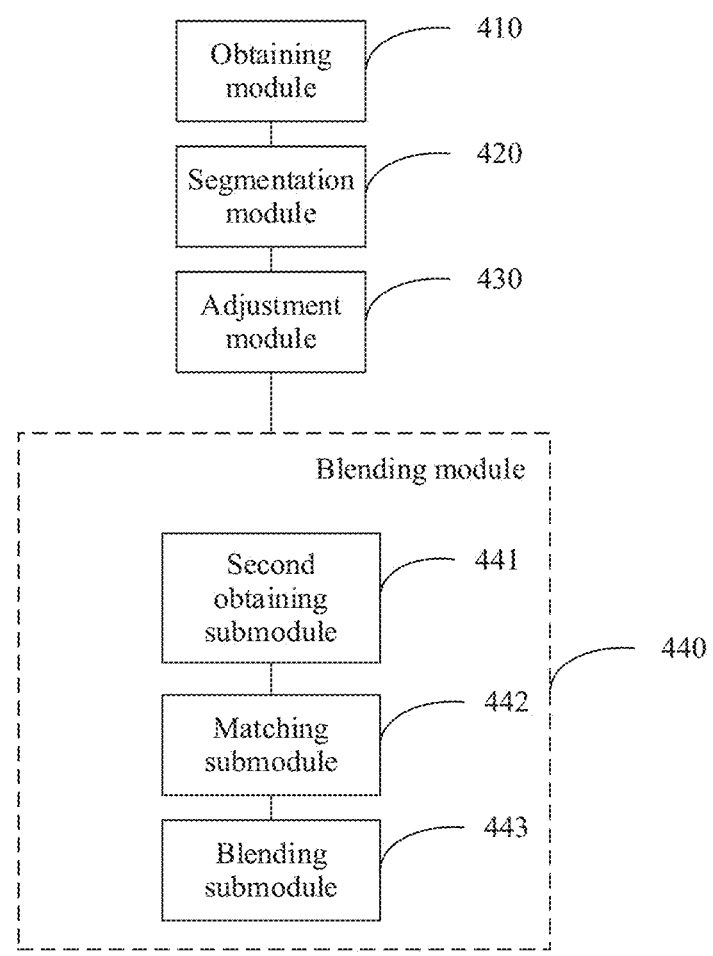
FIG. 28 is a schematic diagram of a second structure of the theme icon generation apparatus in FIG. 26.

FIG. 28 is a schematic diagram of a second structure of the theme icon generation apparatus in FIG. 26, As shown in FIG. 28, based on the apparatus structure shown in FIG. 26, the fusion module 440 includes: a second obtaining submodule 441, a matching submodule 442, and a fusion submodule 443.

The second obtaining submodule 441 is configured to obtain application information corresponding to an application icon.

The application information includes at least one of an application category, an icon background color, and a company to Which an application belongs.

The matching submodule 442 is configured to match a corresponding theme template from a theme template library based on the application information.

The fusion submodule 443 is configured to fuse the second logo graphic with the theme template to generate a theme icon.

Further, to improve a visual effect of the generated theme icon, in a possible implementation, the fusion submodule 443 includes: a third detection unit 4431, configured to detect graphic complexity of the second logo graphic; a superimposing unit 4432, configured to superimpose the second logo graphic on the theme template when the graphic complexity is less than a third preset threshold, to generate a theme icon; and a fusion unit 4433, configured to: when the graphic complexity is greater than or equal to the third preset threshold, perform poisson blending on the second logo graphic and the theme template, to generate a theme icon.

Therefore, the theme template corresponding to the second logo graphic is matched based on application information corresponding to an application icon, to generate the theme icon.

To implement the foregoing embodiments, an embodiment of this application further provides a computer device. FIG. 4 is a schematic diagram of a structure of the computer device. When instructions in the computer device are executed by a processor, the theme icon generation method in the foregoing embodiment is implemented.

Figure 29:
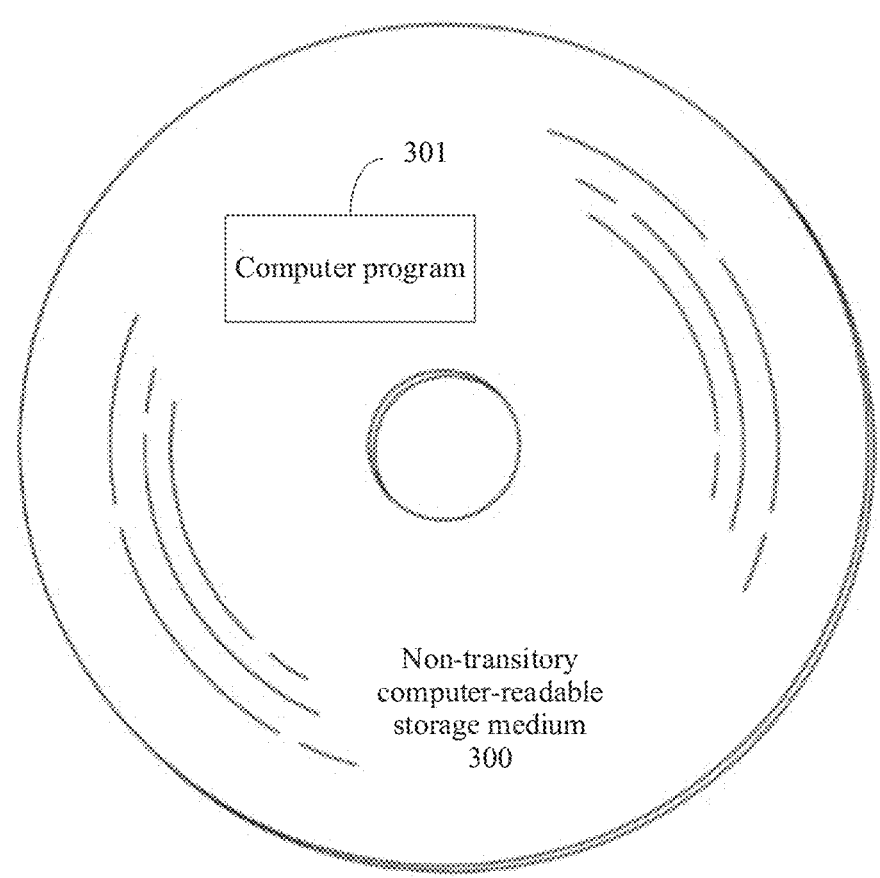
FIG. 29 is a schematic diagram of a structure of a non-transitory computer-readable storage medium.

To implement the foregoing embodiments, an embodiment of this application further provides a non-transitory computer-readable storage medium. FIG. 29 is a schematic diagram of a structure of a non-transitory computer-readable storage medium. The non-transitory computer-readable storage medium stores a computer program. When the computer program runs on a computer, the computer is enabled to perform the theme icon generation method in the foregoing embodiment.

In embodiments of this application, "at least one" means one or more, and "a plurality of" means two or more. The term "and/or" describes an association relationship for describing associated objects and indicates that three relationships may exist. For example, A and/or B may indicate the following three cases: Only A exists, both A and B exist, and only B exists. A and B may be in a singular form or a plural form. The character "l" generally represents an "or" relationship between the associated objects. At least one of the following items and similar expressions refer to any combination of the items, including a single item or any combination of plural items. For example, at least one of a, b, and c may indicate a, b, c, a and b, a and c, b and c, or a, b, and c, where a, b, and c may be singular or plural.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

Persons skilled in the art may clearly understand that, for convenient and brief description, for detailed working processes of the foregoing system, apparatus, and unit, refer to corresponding processes in the foregoing method embodiment. Details are not described herein again.

In the embodiments of this application, when any of the functions are implemented in a form of a software functional unit and sold or used as an independent product, the functions may be stored in a computer-readable storage medium. Based on this understanding, the technical solutions of this application essentially, or the part contributing to the conventional technology, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in embodiments of this application. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A method comprising:
   obtaining an application icon comprising a transparent region and an opaque region, wherein the opaque region comprises an icon background and a first logo graphic;
   segmenting the first logo graphic from the opaque region;
   adjusting a first size of the first logo graphic to generate a second logo graphic; and
   obtaining application information corresponding to the application icon, wherein the application information comprises at least one of an application category, an icon background color, or a company to which an application belongs;
   matching, based on the application information, a theme template from a theme template library;
   detecting a graphic complexity of the second logo graphic;
   superimposing, when the graphic complexity is less than a third preset threshold, the second logo graphic on the theme template to generate a theme icon;
   performing, when the graphic complexity is greater than or equal to the third preset threshold, a Poisson blending on the second logo graphic and the theme template to generate the theme icon; and
   fusing the second logo graphic with the theme template to generate the theme icon.

2. The method of claim 1, further comprising:
   performing a binarization processing on the application icon to determine the opaque region; and
   performing an image segmentation processing on the opaque region to generate the first logo graphic.

3. The method of claim 1, further comprising:
   obtaining a theme reference icon;
   segmenting a reference logo graphic from the theme reference icon; and
   further adjusting, based on a second size of the reference logo graphic, the first size of the first logo graphic.

4. The method of claim 3, wherein adjusting the first size of the first logo graphic based on the second size of the reference logo graphic comprises:
   comparing the first size of the first logo graphic with the second size of the reference logo graphic to obtain a comparison result; and
   scaling, based on the comparison result and using an interpolation algorithm, the first logo graphic to make a third size of the second logo graphic to be the same as the second size of the reference logo graphic.

5. The method of claim 4, wherein after scaling the first logo graphic, the method further comprises:
   generating a color histogram corresponding to the reference logo graphic; and
   determining, based on a color quantity in the color histogram and a hue distribution in the color histogram, a color gradient status of the reference logo graphic.

6. The method of claim 5, wherein determining the color gradient status of the reference logo graphic based on the color quantity and the hue distribution in the color histogram comprises:
   determining, when the color quantity is less than or equal to a first preset threshold, that the reference logo graphic is monochrome, and that no color gradient exists;
   determining, when the color quantity is greater than the first preset threshold, and a color difference between two colors is less than a second preset threshold, that color gradient exists in the reference logo graphic; and
   determining, when the color quantity is greater than the first preset threshold, and a color difference between any two colors is greater than or equal to the second preset threshold, that the reference logo graphic comprises a plurality of colors, and that no color gradient exists.

7. An apparatus, comprising:
   a memory configured to store instructions; and
   a processor coupled to the memory, wherein the instructions cause the processor to be configured to:
      obtain an application icon comprising a transparent region and an opaque region, wherein the opaque region comprises an icon background and a first logo graphic;
      segment the first logo graphic from the opaque region;
      adjust a first size of the first logo graphic to generate a second logo graphic; and
      obtain application information corresponding to the application icon, wherein the application information comprises at least one of an application category, an icon background color, or a company to which an application belongs;

match, based on the application information, a theme template from a theme template library;
detect a graphic complexity of the second logo graphic;
superimpose the second logo graphic on the theme template when the graphic complexity is less than a third preset threshold to generate a theme icon;
perform a Poisson blending on the second logo graphic and the theme template when the graphic complexity is greater than or equal to the third preset threshold to generate the theme icon; and
fuse the second logo graphic with the theme template to generate the theme icon.

8. The apparatus of claim 7, wherein the instructions further cause the processor to be configured to:
perform a binarization processing on the application icon to determine the opaque region; and
perform an image segmentation processing on the opaque region to generate the first logo graphic.

9. The apparatus of claim 7, wherein the instructions further cause the processor to be configured to:
obtain a theme reference icon;
segment a reference logo graphic from the theme reference icon; and
further adjust, based on a second size of the reference logo graphic, the first size of the first logo graphic.

10. The apparatus of claim 9, wherein the instructions further cause the processor to be configured to adjust the first size of the first logo graphic based on the second size of the reference logo graphic by:
comparing the first size of the first logo graphic with the second size of the reference logo graphic to obtain a comparison result; and
scaling, based on the comparison result and using an interpolation algorithm, the first logo graphic to make a third size of the second logo graphic to be the same as the second size of the reference logo graphic.

11. The apparatus of claim 10, wherein after scaling the first logo graphic, the instructions further cause the processor to be configured to:
generate a color histogram corresponding to the reference logo graphic; and
determine, based on a color quantity in the color histogram and a hue distribution in the color histogram, a color gradient status of the reference logo graphic.

12. The apparatus of claim 11, wherein the instructions further cause the processor to be configured to determine the color gradient status of the reference logo graphic based on the color quantity and the hue distribution in the color histogram by:
determining that the reference logo graphic is monochrome and a color gradient does not exist in the reference logo graphic when the color quantity is less than or equal to a first preset threshold;
determining that the color gradient exists in the reference logo graphic when the color quantity is greater than the first preset threshold and a color difference between two colors is less than a second preset threshold; and
determining that the reference logo graphic comprises a plurality of colors and does not comprise the color gradient when the color quantity is greater than the first preset threshold, and a color difference between any two colors is greater than or equal to the second preset threshold.

13. A computer program product comprising computer-executable instructions that are stored on a non-transitory computer-readable storage medium and that, when executed by a processor, cause an apparatus to:
obtain an application icon comprising a transparent region and an opaque region, wherein the opaque region comprises an icon background and a first logo graphic;
segment the first logo graphic from the opaque region;
adjust a first size of the first logo graphic to generate a second logo graphic; and
obtain application information corresponding to the application icon, wherein the application information comprises at least one of an application category, an icon background color, or a company to which an application belongs;
match, based on the application information, a theme template from a theme template library;
detect a graphic complexity of the second logo graphic;
superimpose the second logo graphic on the theme template when the graphic complexity is less than a third preset threshold to generate a theme icon;
perform a Poisson blending on the second logo graphic and the theme template when the graphic complexity is greater than or equal to the third preset threshold to generate the theme icon; and
fuse the second logo graphic with the theme template to generate the theme icon.

14. The computer program product of claim 13, wherein the computer-executable instructions further cause the apparatus to:
perform a binarization processing on the application icon to determine the opaque region; and
perform an image segmentation processing on the opaque region to generate the first logo graphic.

15. The computer program product of claim 13, wherein the computer-executable instructions further cause the apparatus to:
obtain a theme reference icon;
segment a reference logo graphic from the theme reference icon; and
further adjust, based on a second size of the reference logo graphic, the first size of the first logo graphic.

16. The computer program product of claim 15, wherein the computer-executable instructions further cause the apparatus to be configured to adjust the first size of the first logo graphic based on the second size of the reference logo graphic by:
comparing the first size of the first logo graphic with the second size of the reference logo graphic to obtain a comparison result; and
scaling, based on the comparison result and using an interpolation algorithm, the first logo graphic to make a third size of the second logo graphic to be the same as the second size of the reference logo graphic.

17. The computer program product of claim 16, wherein after scaling the first logo graphic, the computer-executable instructions further cause the apparatus to:
generate a color histogram corresponding to the reference logo graphic; and
determine, based on a color quantity in the color histogram and a hue distribution in the color histogram, a color gradient status of the reference logo graphic.

18. The computer program product of claim 17, wherein the computer-executable instructions further cause the apparatus to be configured to determine the color gradient status of the reference logo graphic based on the color quantity and the hue distribution in the color histogram by:
determining that the reference logo graphic is monochrome and a color gradient does not exist in the reference logo graphic when the color quantity is less than or equal to a first preset threshold;

determining that the color gradient exists in the reference logo graphic when the color quantity is greater than the first preset threshold and a color difference between two colors is less than a second preset threshold; and determining that the reference logo graphic comprises a plurality of colors and does not comprise the color gradient when the color quantity is greater than the first preset threshold, and a color difference between any two colors is greater than or equal to the second preset threshold.

* * * * *

UNITED STATES PATENT AND TRADEMARK OFFICE
CERTIFICATE OF CORRECTION

PATENT NO. : 12,112,405 B2
APPLICATION NO. : 17/788463
DATED : October 8, 2024
INVENTOR(S) : Wenjie Zhang and Weicai Zhong Page 1 of 1

It is certified that error appears in the above-identified patent and that said Letters Patent is hereby corrected as shown below:

In the Claims

Claim 7, Column 20, Line 62: "graphic; and" should read "graphic;"

Signed and Sealed this
Eighth Day of April, 2025

Coke Morgan Stewart
*Acting Director of the United States Patent and Trademark Office*